(12) United States Patent
Zhou et al.

(10) Patent No.: US 12,317,348 B2
(45) Date of Patent: May 27, 2025

(54) DEVICE-ASSISTED COMMUNICATION WITH NETWORK CODING

(71) Applicant: QUALCOMM Incorporated, San Diego, CA (US)

(72) Inventors: Shanyu Zhou, San Diego, CA (US); Olufunmilola Omolade Awoniyi-Oteri, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/209,211

(22) Filed: Mar. 22, 2021

(65) Prior Publication Data
US 2022/0304088 A1    Sep. 22, 2022

(51) Int. Cl.
| | |
|---|---|
| *H04W 4/00* | (2018.01) |
| *H04L 1/00* | (2006.01) |
| *H04W 4/06* | (2009.01) |
| *H04W 72/04* | (2023.01) |
| *H04W 72/30* | (2023.01) |
| *H04W 76/15* | (2018.01) |

(52) U.S. Cl.
CPC ........... *H04W 76/15* (2018.02); *H04L 1/0009* (2013.01); *H04W 4/06* (2013.01); *H04W 72/04* (2013.01); *H04W 72/30* (2023.01)

(58) Field of Classification Search
None
See application file for complete search history.

(56) References Cited

U.S. PATENT DOCUMENTS

| | | | |
|---|---|---|---|
| 2013/0016629 A1* | 1/2013 | Mallik | H04W 8/005 370/255 |
| 2017/0117987 A1* | 4/2017 | Park | H04L 1/0075 |
| 2017/0149490 A1 | 5/2017 | Sfar et al. | |
| 2018/0367261 A1* | 12/2018 | Gonzalves Serrano | H04L 1/0029 |

(Continued)

FOREIGN PATENT DOCUMENTS

| | | | | |
|---|---|---|---|---|
| WO | WO2020200452 | * | 10/2020 | H04L 1/00 |

OTHER PUBLICATIONS

International Search Report and Written Opinion dated Jun. 9, 2022 from corresponding PCT Application No. PCT/US2022/070741.

*Primary Examiner* — Abdelillah Elmejjarmi
(74) *Attorney, Agent, or Firm* — Arent Fox, LLP

(57) ABSTRACT

In an aspect of the disclosure, a UE may be configured to receive a dataset in an encoded format on a network communication interface. The UE may be further configured to transmit a unicast transmission including a subset of the dataset on a direct communication interface to another UE when a non-unicast transmission is received indicating that the other UE failed to successfully receive the subset of the dataset. The other UE may be configured to transmit, on the direct communication interface, a non-unicast transmission indicating a failure to successfully receive a subset of a dataset on a network communication interface. The other UE may be further configured to receive a unicast transmission including the subset of the dataset on the direct communication interface. A base station may configure the UEs to communicate data on the direct communication interface after receiving the data on a network communication interface.

21 Claims, 11 Drawing Sheets

(56) References Cited

U.S. PATENT DOCUMENTS

| | | |
|---|---|---|
| 2018/0367324 A1 | 12/2018 | Bekiares et al. |
| 2019/0069341 A1* | 2/2019 | Jia .......................... H04L 1/0041 |
| 2019/0221110 A1* | 7/2019 | Vanderveen ........... G06V 20/58 |
| 2020/0413442 A1* | 12/2020 | Balasubramanian ........................ H04L 1/1854 |
| 2021/0037503 A1 | 2/2021 | Nam et al. |
| 2021/0058198 A1* | 2/2021 | Cao ........................ H04W 72/20 |
| 2021/0345378 A1* | 11/2021 | Lu .......................... H04W 76/11 |
| 2022/0007403 A1* | 1/2022 | Li ...................... H04W 72/1289 |

* cited by examiner

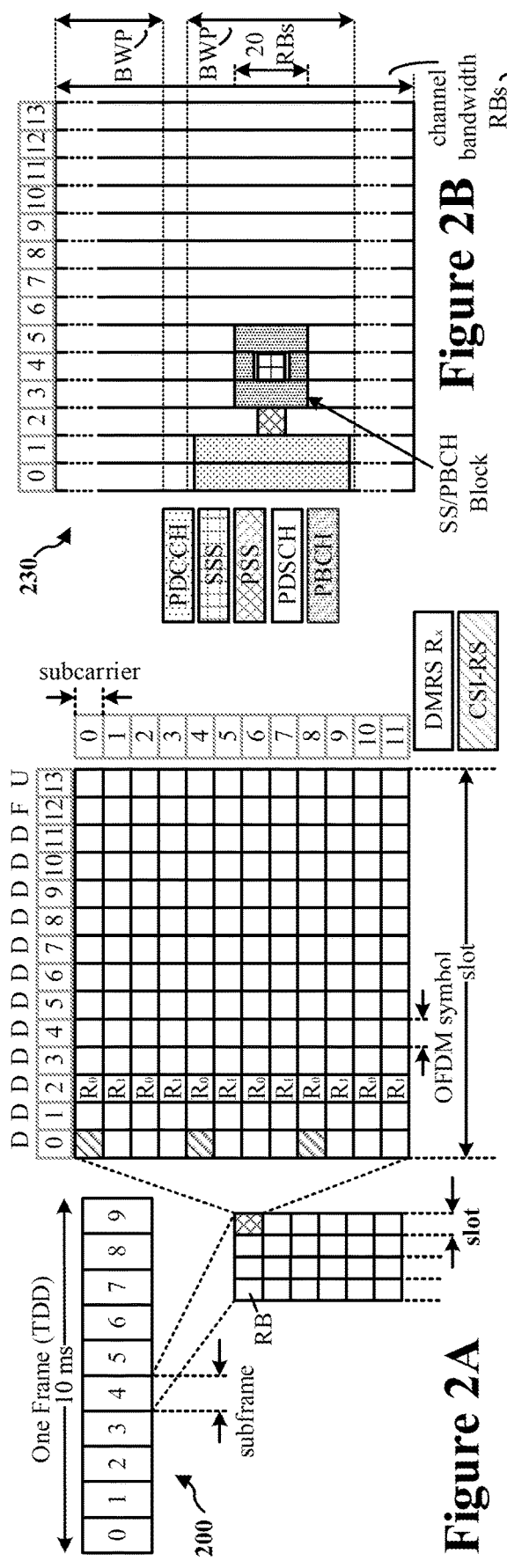
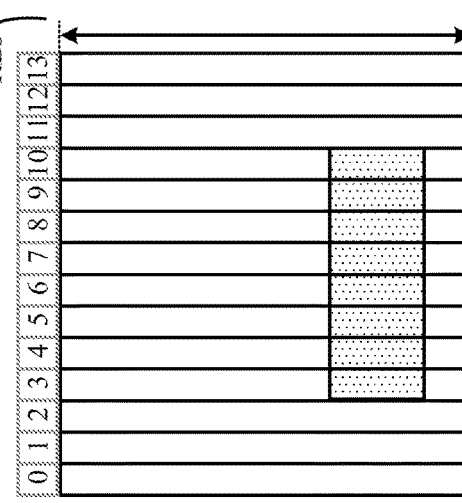
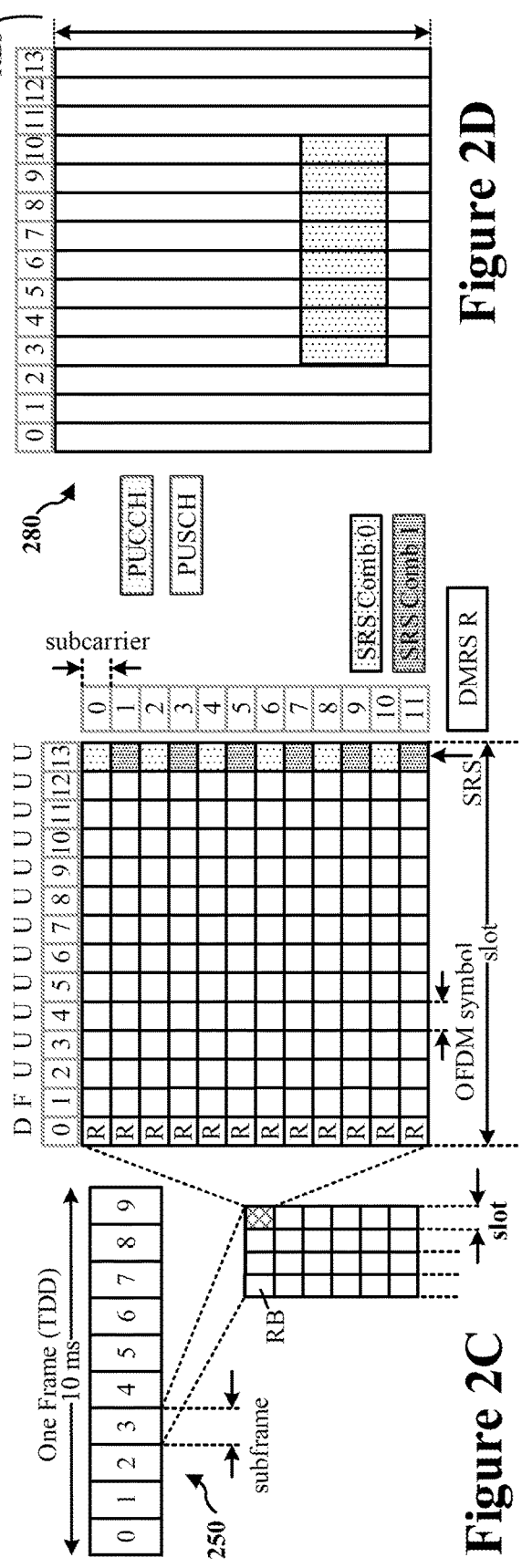
Figure 2A
Figure 2B
Figure 2C
Figure 2D

DEVICE-ASSISTED COMMUNICATION WITH NETWORK CODING

BACKGROUND

Technical Field

The present disclosure generally relates to communication systems, and more particularly, to network coding in wireless communication between apparatuses.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Channels or wireless mediums on which apparatuses communicate in a network are often less than ideal. For example, wireless channel environments frequently include interference, blockages, noise, or other elements tending to degrade signal transmission. Therefore, some data loss is likely to occur during transmission, for example, including bit erasures. Network coding (NC) provides a mechanism for reducing data loss. With NC, data is divided into subunits and redundantly encoded by a transmitter at a coding rate. The encoded data transmitted to a receiver, which may recover the original data from the encoded data based on the redundancy.

However, encoding data packets with NC causes each data packet to be divided over multiple encoded packets so that the only mechanism available to recover the original data packet at the receiver is to decode those multiple encoded packets. When a receiver fails to successfully receive one or more encoded packets that are critical to recovering an original data packet, the receiver may be left without recourse if the transmitter does not retransmit the missing encoded packets. Imposing a requirement that all transmitters using NC must retransmit packets that receivers are missing is neither desirable nor practical though.

Thus, a need exists for approaches to improving data reliability and throughput with NC. The present disclosure provides some techniques and solutions to providing encoded packets to a receiver where the transmitter does not retransmit the lost packets. In particular, the present disclosure describes various aspects in which a transmitter, such as a base station, broadcasts or multicasts a set of coded packets, encoded according to NC, to a group of UEs. If one of the UEs misses one of the coded packets, then the UE may request the missing coded packet on a sidelink channel, and another one of the UEs may transmit the missing coded packet to the requesting UE so that the requesting UE is able to recover one or more uncoded packets In an aspect of the disclosure, a method, a computer-readable medium, and an apparatus are provided. The apparatus may be a UE or a component thereof configured to receive a dataset in an encoded format on a network communication interface. The apparatus may be further configured to transmit a unicast transmission including a subset of the dataset on a direct communication interface to another UE when a non-unicast transmission is received indicating that the other UE failed to successfully receive the subset of the dataset.

In another aspect of the disclosure, another method, another computer-readable medium, and another apparatus are provided. The other apparatus may be a UE or a component thereof configured to transmit, on a direct communication interface, a non-unicast transmission indicating a failure to successfully receive a subset of a dataset on a network communication interface. The apparatus may be further configured to receive a unicast transmission including the subset of the dataset on the direct communication interface.

In an additional aspect of the disclosure, an additional method, an additional computer-readable medium, and an additional apparatus are provided. The additional apparatus may be a base station or a component thereof configured to configure a plurality of UEs to communicate data on a direct communication interface after receiving the data on a network communication interface. The additional apparatus may be further configured to transmit a non-unicast transmission including a dataset in an encoded format on the network communication interface. The additional apparatus may be further configured to suppress retransmission of a subset of the dataset when a number of UEs failing to successfully receive the subset of the dataset fails to satisfy a threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
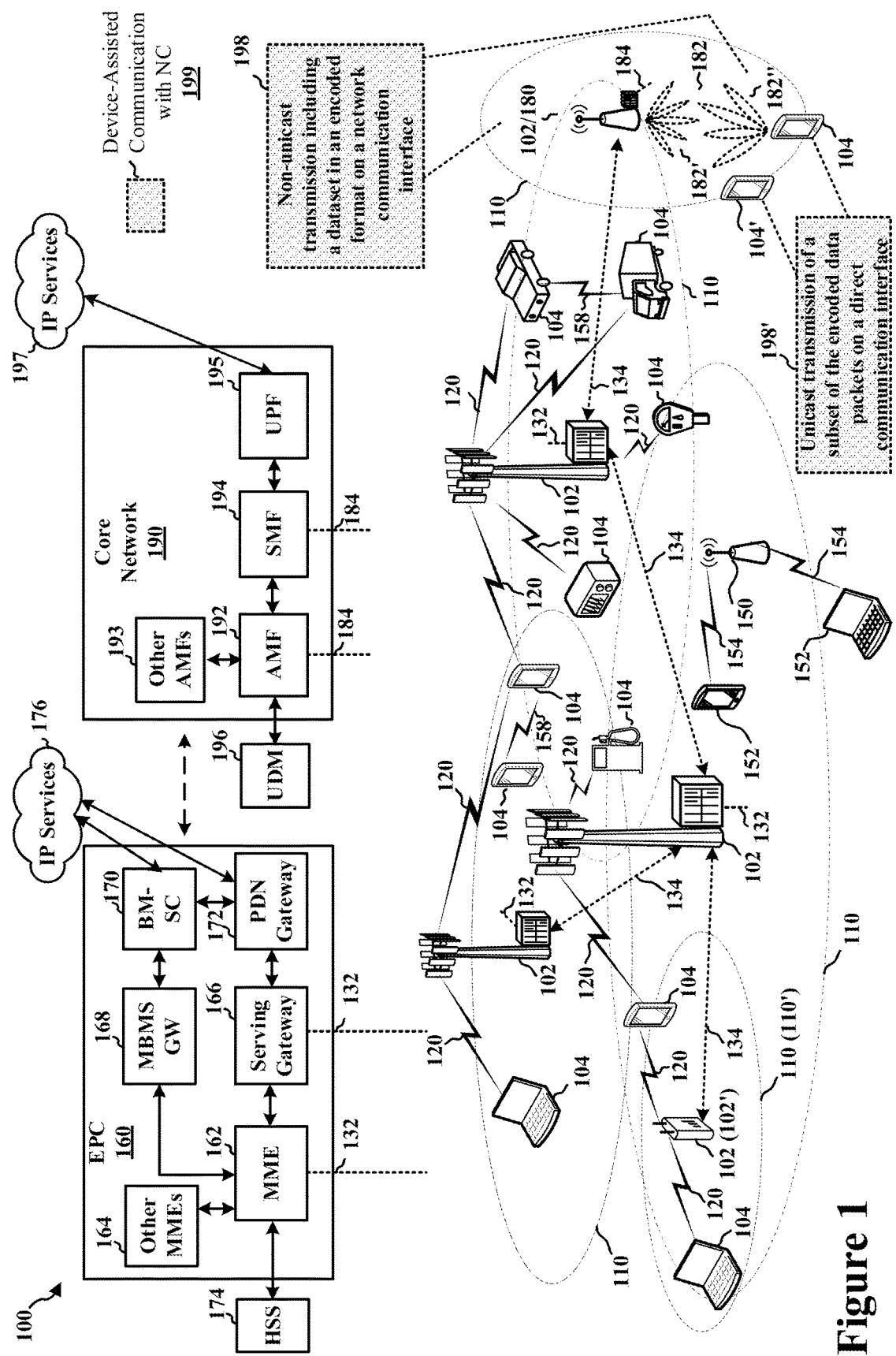
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In general, the channels on which devices communicate in a network are not ideal channels, and particularly in wireless networking applications. Therefore, some data loss is likely to occur during transmission. Network coding (NC) provides a mechanism for reducing data loss. With NC, data is divided into subunits and redundantly encoded by a transmit (TX) side. For example, one original packet may be divided into a number k of subpackets. And the k subpackets encoded into a number n of encoded packets according to a coding rate. The probability of a receive (RX) side receiving the data may be increased, as the redundant information in the n encoded packets may provide the receiver with more opportunities to recover the data, for example, when the encoded packets are received with bit erasures.

However, the inherently random and time-variant nature of wireless environments may result in lost or missed packets, and/or devices may fail to successfully receive or decode some (or all) of the n encoded packets transmitted by the TX side, which may prevent some original data from being recovered. Illustratively, with fountain coding, such as Raptor codes and Luby Transform (LT) codes, a single data packet may be encoded into multiple encoded packets, with no single encoded packet including sufficient information to recover the entirety of the original data packet.

At the RX side, the original data packet is recovered by piecing together bits received across the multiple encoded packets. Consequently, if a subset of a set of encoded packets is not successfully received by the RX (e.g., due to dropped or missed packets, decoding errors, etc.), the RX side may lack any alternatives for recovering the original data packet. In other words, the only way to recover the original data packet (at least at some receivers) may be to obtain the missing encoded packets so that the decoding algorithm can be followed to piece the original data packet back together, e.g., bit by bit. The obvious answer to this issue is to implement a feedback-based retransmission mechanism so that the RX side can inform the TX side of which encoded packets the RX side failed to successfully receive, and the TX side can respond in turn by retransmitting those missing packets.

However, in many instances, the TX side may not be able to, or it may be undesirable for the TX side to, retransmit the missing encoded packets. For example, when the TX side is transmitting to a relatively large number of devices, there may be insufficient time for the TX side to address each retransmission request, as with certain low-latency applications such as ultra-reliable low-latency communications (URLLC) which imposes some certain delivery rate with a certain error rate. In another example, a TX side may be unable to respond to every indication from every RX side to which the TX side is transmitting, such as when the TX side broadcasts.

Thus, a need exists for approaches to improving data reliability and throughput with NC. The present disclosure provides some techniques and solutions to providing data (e.g., encoded into packets with NC) to an RX side where the TX side does not retransmit data the RX side failed to successfully receive. In particular, the present disclosure describes various aspects in which a transmitter, such as a base station, broadcasts or multicasts a set of coded packets, encoded according to NC, to a group of receivers. If one of the UEs misses one of the coded packets, then the UE may request the missing coded packet on a sidelink channel, and another one of the UEs may transmit the missing coded packet to the requesting UE so that the requesting UE is able to recover one or more uncoded packets. Some additional or alternative aspects and various concepts are further provided herein.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may configure multiple UEs 104, 104' in the coverage area 110 for UE-assisted communication with NC 199. For example, the base station 102/180 may configure the UEs 104, 104' to communicate data on a direct communication interface after receiving data on a network communication interface. The base station 102/180 may further transmit a non-unicast transmission 199 including a dataset in an encoded format on the network communication interface.

Due to the time-variant nature of the wireless channel, one of the UEs 104 may receive only a subset of the dataset in the encoded format. According to the present disclosure, however, the UEs may be configured to provide one another with subsets of the dataset (e.g., in the encoded format) when those subsets are not received. To that end, a first UE 104 that has missed a subset of the dataset may be allowed to transmit, on the direct communication interface, a non-unicast transmission indicating a failure to successfully receive the subset of the dataset on the network communication interface. In return, the first UE 104 may receive a unicast transmission including the subset of the dataset on the direct communication interface 198'.

A second UE 104' may receive the dataset in the encoded format on the network communication interface, or at least may receive the subset of the dataset (missing at the first UE 104). Further, the second UE 104' may receive the non-unicast transmission indicating that the first UE 104 failed to successfully receive the subset of the dataset. In response, the second UE 104' may transmit a unicast transmission including the subset of the dataset on the direct communication interface 198' to the first UE 104. Thus, transmission of the dataset may be kept in sync across multiple UEs without retransmissions of missing packets at the base station 102/180.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu$ * 15 kilohertz (kHz), where pt is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 microseconds (µs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as Rx for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
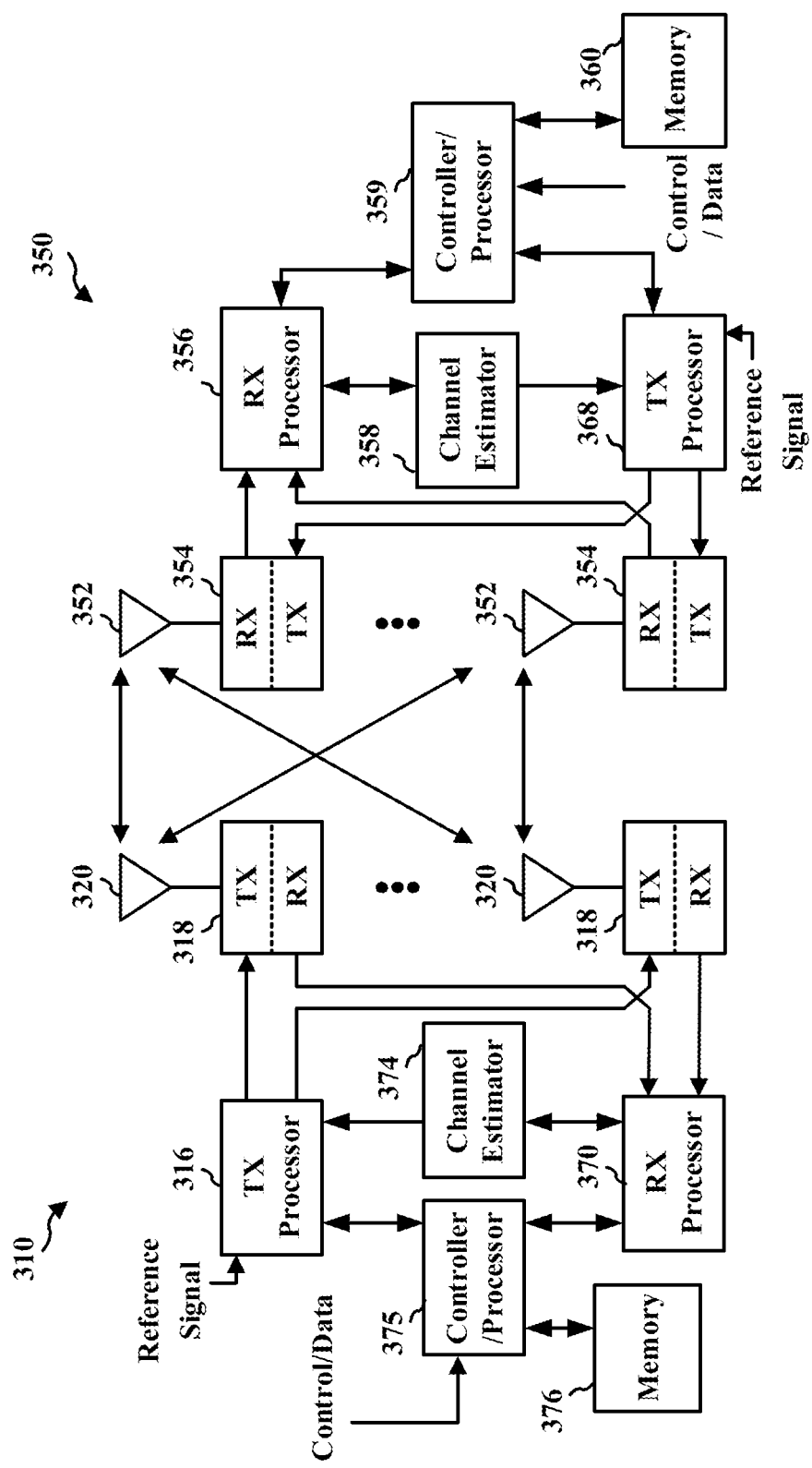
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the device-assisted communication with NC 199, including receiving the broadcast or multicast transmission of the set of encoded packets on the network communication interface 198 and receiving and/or transmitting the unicast transmission of the set of encoded packets on the direct communication interface198', as shown in FIG. 1.

At least one of the TX processor 316, the RX processor 370, and the controller/processor 375 may be configured to perform aspects in connection the device-assisted communication with NC 199, including transmitting the broadcast or multicast transmission of the set of encoded packets on the network communication interface 198 and configuring UEs to receive and/or transmit the unicast transmission of a set of encoded packets on a direct communication interface 198', as shown in FIG. 1.

Figure 4:
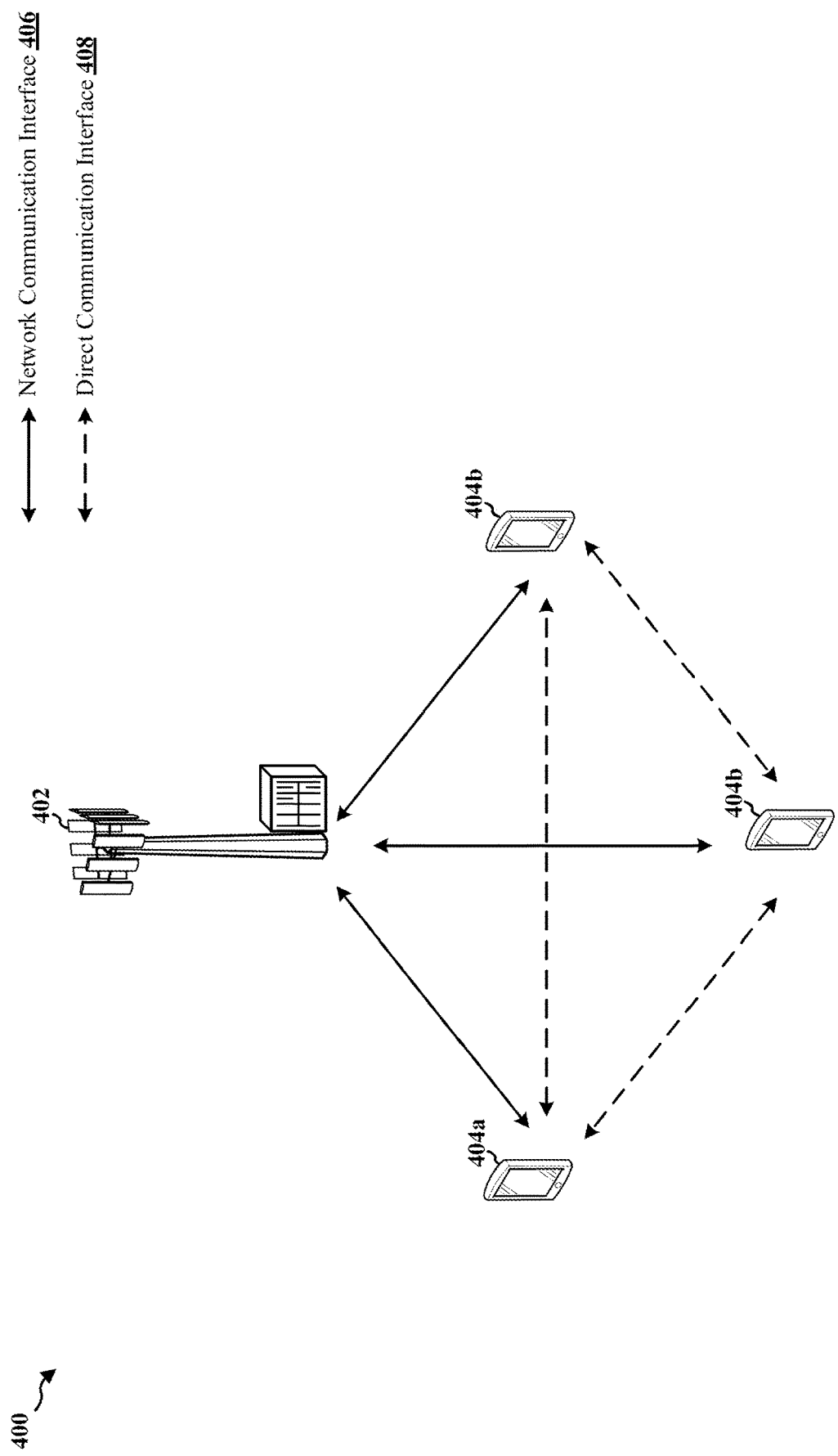
FIG. 4 is a diagram illustrating an example of a base station in communication on a network communication interface with UEs in communication on a direct communication interface.

FIG. 4 is a diagram 400 illustrating an example of a base station 402 in communication on a network communication interface with UEs 404a-c in communication on a direct communication interface. In some instances, a base station 402 may have some data to transmit that is common across a group of UEs that includes $UE_1$ 404a, $UE_2$ 404b, and $UE_3$ 404c (collectively, UEs 404). For example, the base station 402 may have some data is to be broadcast multicast in a cell or coverage area of the base station 402, e.g., because the data is common to all the UEs in the coverage area or all UEs grouped together in a multicast group. Accordingly, the base station 402 may transmit a broadcast or multicast transmission that includes packets of data intended for the UEs 404.

The base station 402 may transmit, and the UEs 404 may receive, such data packets on a network communication interface 406. The network communication interface 406 may be an interface on which the UEs 404 communicate with an access network or other wireless network. The network communication interface 406 may also be known as an "air interface." For example, the network communication interface 406 may include a Uu interface linking the UEs 404 to a RAN. However, the network communication interface 406 may include any interface that links a mobile or other cellular device with a base station, and on which at least one of uplink and/or downlink communication is carried.

In addition to network connectivity on the network communication interface 406, the UEs 404 may be configured for direction communication. Direct communication may include any communication directly between devices that is not carried by a network entity (e.g., the base station 402) and/or does not need to be scheduled by a network entity (e.g., the base station 402) in order to take place. For example, a network entity (e.g., the base station 402) may reserve some resources for direct communication in order to prevent interference to communication on the network communication interface 406.

Direct communication between at least two of the UEs 404 may be on a direct communication interface 408, which may be an interface for those devices that are not constituent elements of the RAN but receive connectivity through the RAN. Often, such devices are referred to as UEs, whether implemented in a mobile phone, an automobile, a sensor, and so forth. The direct communication interface 408 may include any interface that links together devices that are not part of a RAN but receive connectivity through the RAN (e.g., via the base station 402). For example, the direct communication interface 408 may include a PC5 interface or other interface on which sidelink communication is carried.

In the illustrated aspect, the base station 402 may be configured to transmit data to the UE 404 on the network communication interface 406. The random and time-variant nature of wireless channels, different ones of the UEs 404 will experience different channel conditions when receiving data from the base station 402 on the network communication interface 406.

While random channel conditions (or other factors) may prevent some portions of packetized data from being received at one UE, the missed packets may have been received at another UE, even where the other UE missed some packets of its own. The variance in which packets are received at each UE can be exploited to reduce the burden on a base station to retransmit missing packets to UEs. In particular, UEs receiving a non-unicast transmission over the network communication interface may be configured to request missing packets over the direct communication interface. One of the UEs that received those missing packets may transmit the missing packet in a unicast transmission.

Figure 5:
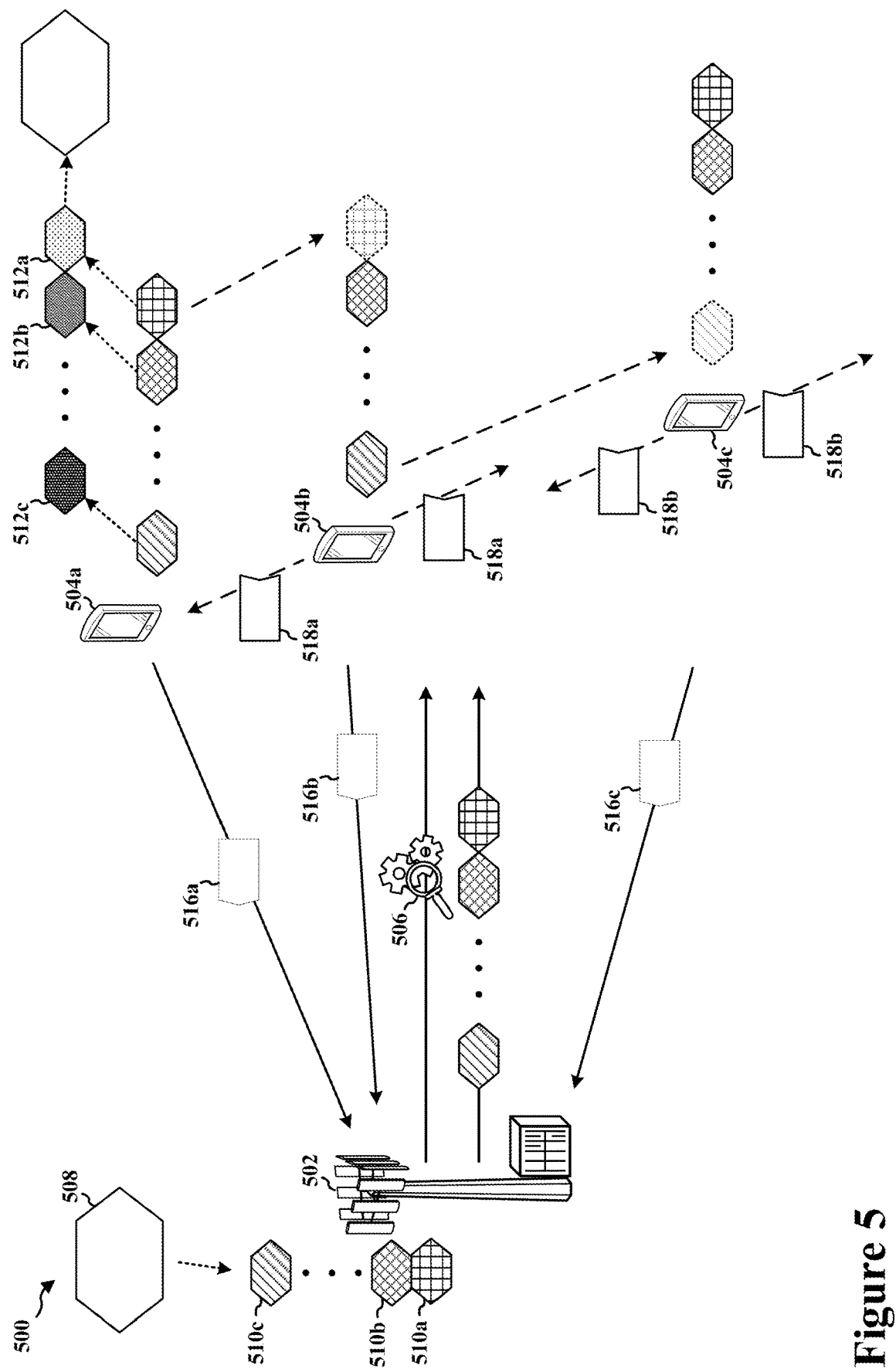
FIG. 5 is a diagram illustrating an example of a wireless environment including a base station and UEs in UE-assisted communication with network coding (NC).
Figure 6:
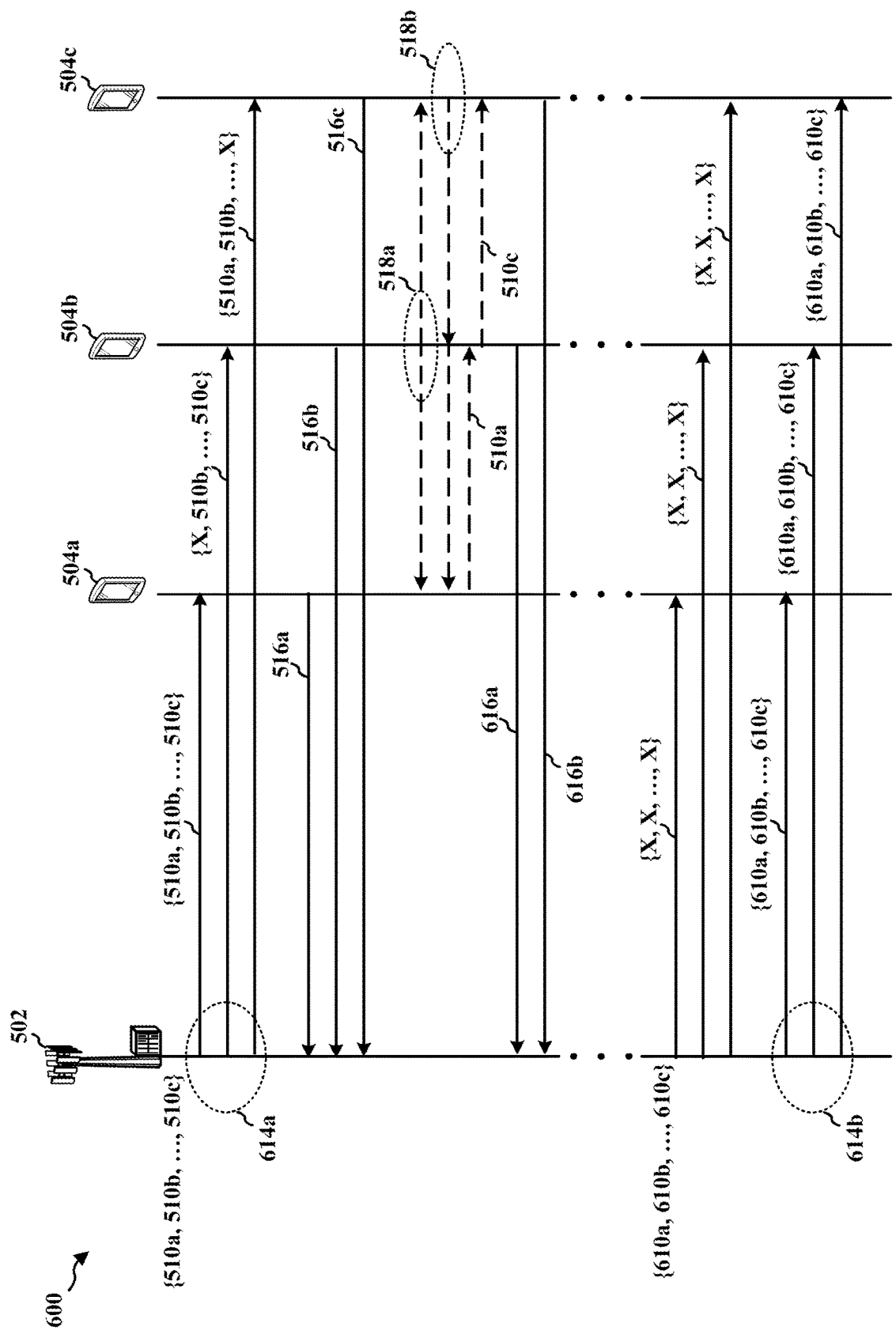
FIG. 6 is a call flow diagram illustrating an example of a communication flow in the wireless environment including the base station and UEs in UE-assisted communication with NC.

With reference to FIGS. 5 and 6, FIG. 5 is a diagram 500 illustrating an example of a wireless environment including a base station 502, and a first $UE_1$ 504a, a second $UE_2$ 504b, and through an $i^{th}$ UE, 504c (collectively, the UEs 504), which are configured for UE-assisted communication with NC. FIG. 6 is a call flow diagram 600 illustrating an example of a communications and operations flow in such a wireless environment. The base station 502 may implement NC, e.g., in order prevent or reduces the incidences of packet discards due to bit erasures.

In order to reduce the latency and overhead at the base station 502, the UEs 504 may be configured to supply one another with missing data that one of the UEs 504 successfully received but another failed to successfully receive. With such UE-assisted NC communication, the UEs 504 may quickly and efficiently recover from failures to successfully receive some subsets of a dataset through assistance of neighboring UEs.

In some aspects, this functionality may be enabled or activated in the UEs 504 in order for the UEs to assist with NC communication. Accordingly, the base station 102/180 may transmit, on the network communication interface, and each of the UEs 504 may receive on the network communication interface, a configuration 506 for communication of data on the direct communication interface to UEs failing to successfully receive the data on the network communication interface.

In some aspects, the base station 502 may allocate (or pre-allocate) one or more sets of resources associated with this UE-assisted NC communication, such as resources associated with the network communication interface (e.g., resources on the downlink and/or on the uplink) and/or resources associated with the direct communication interface (e.g., resources on the sidelink). For example, the configuration 506 may indicate at least one of: (1) a set of resources allocated for non-unicast transmissions indicating data that is unsuccessfully received on the network communication interface, (2) a set of resources on the direct communication interface allocated for unicast transmissions of data received on the network communication interface, and/or (3) a set of resources on the network communication interface allocated for uplink feedback reporting for data received on the network communication interface.

In some aspects, the base station 502 may have some data that is to be transmitted to multiple UEs 504. For example, the base station 502 may determine that there is some important or emergency data should be distributed to every UE in the coverage area of the base station 502. In some such instances, the base station 502 may opt to broadcast the data.

In some other aspects, the base station 502 may have some data that is applicable to discrete groups of UEs. The base station 502 may organize some UEs in a coverage area of the base station 502 into a group, and the base station 502 may determine to multicast the data to the UEs 504 of the group. Potentially, multicast may include any type of one-to-many transmission scheme, including groupcast and the like.

In data transmission using NC, a transmitter, such as the base station 502, may store (e.g., buffer) data for transmission to the UEs 504. The data may be considered a dataset 508, which may represent one or more uncoded data packets (e.g., including PDUs), and/or another data structure, such as a segment, block, datagram, and so forth. The base station 502 may encode the dataset 508 without any fountain coding or other similar going encoding schemes having been applied. For example, the base station 502 may use an NC encoder with an algorithm that implements an LT code, a Raptor code, or an online code.

In order to encode the dataset 508 into an encoded format, the base station 502 may divide the dataset 508 into a number k of subpackets, and the base station 502 may encode the k subpackets into a number n of encoded packets, including a first packet 510a, a second encoded packet 510b, and through an $n^{th}$ encoded packet 510c (collectively, the encoded packets 510). As used herein, data (or other information) that is in an encoded format is equivalently referred to as encoded data (or encoded other information), and similarly, data that is not in the encoded format can equivalently be said to be uncoded data.

In some aspects, the base station 502 may encode the dataset 508 using an encoding function that is consistent for some period of time. For example, at least all of the k subpackets are encoded with the same encoding function. The encoding function may be based on an encoding matrix, which may be randomly or pseudorandomly generated. In the matrix, a row may correspond to a random combination of the k subpackets to be included in an encoded packet at a transmission instance, and a row may be selected for each transmission instance (e.g., rows may be randomly or pseudorandomly selected, rows may be sequentially iterated over, etc.).

In order for the UEs 504 to successfully decode data, each of the UEs 504 may be supplied with information allowing for a decoding process that is complementary to the encoding process. For example, the base station 502 may configure each of the UEs 504 with some NC parameters (e.g., through the configuration 506), such as an encoding matrix, encoding function, a maximum number of decoding iterations, decoding information or other information to aid in maintaining synchronization during NC communication. For example, each of the UEs may be configured by the base station 502 to determine the row of the encoding matrix that is used for each transmission instance. The configuration 506 may be included in at least one of a MAC control element (CE), DCI, and/or RRC configuration from the base station 502 to at least one UE. With that configuration, the UEs 504 may be able to successfully recover the original data from the encoded format when the original data is received in the encoded format in encoded packets.

The base station 502 may transmit the dataset 508 in the encoded format to the UEs 504 on the network communication interface as a non-unicast transmission 614a. The non-unicast transmission 614a may include, for example, a broadcast transmission or a multicast transmission on the network communication interface.

In transmitting the dataset 508 to the UEs 504, the base station 502 may transmit the encoded packets 510 to the UEs 504, as the encoded packets 510 including the dataset 508 in the encoded format. As described, supra, the UEs 504 may be subject to different wireless environments that differently affect how the encoded packets 510 reach each of the UEs 504. Thus, in the illustrated example, a first UE, $UE_1$ 504a, may receive all of the encoded packets 510.

Having received all of the encoded packets 510 necessary to do so on the network communication interface, $UE_1$ 504a my decode the dataset 508 in the encoded format to recover the dataset without the encoded format. In some aspects, the base station 502 may use a belief propagation decoding process to recover the original uncoded dataset 508. For example, the dataset 508 may be encoded using a rateless code, and $UE_1$ 504a may be configured to use a decoder configured with a corresponding algorithm to remove or reverse the encoding that was applied by the base station 502 with the rateless code. In so doing, $UE_1$ 504a may recover, from a number n of encoded packets, a number k of uncoded subpackets 512 into which the dataset 508 was divided for NC. The $UE_1$ 504a may combine or aggregate the first uncoded subpacket 512a, the second uncoded subpacket 512b, and through the $k^{th}$ uncoded subpacket 512c to obtain the uncoded dataset 508.

However, the other two UEs, $UE_2$ 504b and $UE_i$ 504c, may fail to successfully receive all of the encoded packet 510 on the network communication interface. For example, a second UE, $UE_2$ 504b, may fail to successfully receive the first encoded packet 510a, whereas an $i^{th}$ UE, UE, 504c, may fail to successfully receive the $n^{th}$ encoded packet 510c. For example, one of the UEs 504 may fail to successfully receive an encoded packet if the packet is not detected while the UE is monitoring the wireless channel, or if the packet is detected but fails a lower layer check on data integrity or data security.

A UE may determine that some subset of data has not been received, and therefore, the original data cannot be recovered without obtaining the missing subset. Illustratively, $UE_2$ 504b may determine that the first encoded packet 510a is missing by examining one or more of the second through $n^{th}$ encoded packets 510b-c and identifying information indicating a sequence number or similar ordering information. $UE_2$ 504b may identify the sequence numbers or ordering information of the second through $n^{th}$ encoded packets 510b-c, and may determine that each number or other ordering information reflects a consecutive sequence having been received, although the sequence may not begin with an expected value, which may indicate to $UE_2$ 504b that the initial packet leading the sequence of packets was missed.

In some aspects, each of the UEs 504 may transmit some feedback 516 to the base station 502 on the network communication interface that indicates a receiver status associated with the dataset. For example, each of the feedback 516 may include a respective value corresponding to one of the encoded packets 510, with each respective value indicating whether the receiver status of the corresponding packet is successfully received or not successfully received.

By way of illustration and not limitation, at least one of the feedback 516 may include at least one of: (1) HARQ feedback, which may be indicative of whether a packet is successfully received at a MAC layer of a UE; (2) automatic repeat request (ARQ) feedback, which may be indicative of whether a packet is successfully received at an RLC layer of a UE; (3) an RLC status report; (4) a PDCP status report; and/or (5) another mechanism enabling a receiver to convey the receiver status of a packet to a transmitter. In some instances, an ACK may be used to convey a receiver status of successfully received, whereas a NACK may be used to convey a receiver status of not successfully received. The ACK/NACK nomenclature is commonly used in the context of ARQ and HARQ, but is generally understood to signify receiver status between transmitter and receiver. For example, an ACK may be conveyed from a receiver to a transmitter to indicate a transmission from the transmitter is successfully received, whereas a NACK may indicate the transmission is not successfully received.

In some aspects, one or more of the UEs 504 may be configured to determine whether a transmission has been successfully received or unsuccessfully received using a data integrity check, data validity check, data security check, or other error detection or correction test. For example, $UE_1$ 504a may generate feedback 516a based on a HARQ scheme and/or ARQ scheme, e.g., in which a packet is considered to be successfully received when a cyclic redundancy check (CRC) or other error-detecting or error-correcting code for the packet successfully passes. In some other aspects, one or more of the feedback 516 may indicate whether a packet is detected and/or whether the packet is decoded.

In still other aspects, one or more of the feedback 516 may include information indicative of the NC decoding process at one of the UEs 504. Feedback originating at some layers, such as HARQ feedback originating at a MAC layer, may be indicative of whether an encoded packet is successfully received, but not especially informative regarding the data in the encoded format in the context of NC decoding and recovery of uncoded datasets. Therefore, one or more of the UEs 504 may be configured to include, in a corresponding one or more of the feedback 516, information indicating an amount of uncoded packets that are successfully recovered or an amount of uncoded packets that are not successfully recovered. Additionally or alternatively, information identifying the successfully and/or unsuccessfully recovered uncoded packets may be reported. Potentially, one or more of the UEs 504 may include such feedback related to NC decoding and recovery in a separate or existing PDCP status report and/or a separate or existing RLC status report.

Thus, $UE_1$ 504a may transmit, to the base station 502, first feedback 516a indicating that $UE_1$ 504a successfully received each of the encoded packets 510. The remaining two UEs, UE$_2$ 504*b* and UE, 504*c*, however, may generate second feedback 516*b* and third feedback 516*c*, respectively, to indicate that only a subset of the dataset 508 was received at those UEs. Specifically, the second feedback 516*b* may indicate that UE$_2$ 504*b* failed to successfully receive the first encoded packet 510*a*, but the remaining encoded packets 510*b-c* were successfully received. The third feedback 516*c* may indicate that UE, 504*c* successfully received some packets, including the first and second packets 510*a-b*, but failed to successfully receive other packets, including the n$^{th}$ encoded packet 510*c*. The UEs 504 may transmit the feedback 516 on resources on the network communication interface, which may be resources configured according to configuration 506 received from the base station 502. For example, the configuration 506 may indicate at least one set of resources configured for the purpose of reporting receiver status associated with UE-assisted NC communication.

In order to take of the advantage of the configured UE-assisted NC communication, UEs may need to inform one another of when packets are missed. For example, UEs may be configured to transmit a non-unicast transmission that other UEs are able to receive. For example, UEs 504 may monitor one or more channels on the direct communication interface, such as one or more sidelink channels. One or more of UEs 504 may monitor such sidelink channel(s) continuously, periodically, aperiodically, or some combination thereof.

UEs that fail to successfully receive subsets of datasets on a network communication interface may subsequently request that other UEs provide the missing subsets, which may reduce overhead on a base station, as well as reduce network congestion. For example, when UE$_2$ 504*b* fails to receive the first encoded packet 510*a*, UE$_2$ 504*b* may transmit a message on the direct communication interface that requests another UE that has received the first encoded packet 510*a* to transmit the first encoded packet 510*a* to UE$_2$ 504*b*. Similarly, when UE, 504*c* fails to receive the n$^{th}$ encoded packet 510*c*, UE, 504*c* may transmit, on the direct communication interface, a message requesting the n$^{th}$ encoded packet 510*c* from one of the other UEs 504*a-b* that received that the message on the network communication interface.

Such a message from a requesting UE may include information identifying the requested subset of the dataset 508. In some aspects, however, the requesting UE (and responding UE) may be unaware of exactly which subset of the dataset 508 is requested—rather, reference may be made to the subset of the dataset 508 via the one or more of the encoded packets 510 into which the requested subset of the dataset 508. For example, UE$_2$ 504*b* may request a subset of the dataset 508 that is encoded into the first packet 510*a*; however, without the first packet 510*a*, UE$_2$ 504*b* may be unable to recover the dataset 508, and may be unable to delineate the subset of the dataset without the encoding format that is being requested.

However, UE$_2$ 504*b* may be aware that the sequence of encoded packets 510 is incomplete or broken at some point (e.g., at the beginning of the sequence of the encoded packets 510 or another position at which the first encoded packet 510*a* is expected). Accordingly, UE$_2$ 504*b* may include information identifying the first encoded packet 510*a*, which includes the subset of the dataset 508 that would allow UE$_2$ 504*b* to recover the dataset 508 from the encoded packets 510. For example, UE$_2$ 504*b* may include a packet identifier (ID), a sequence ID, a hostname or host ID, or other information, or combination thereof to uniquely distinguish between packets.

Similarly, UE, 504*c* may generate a message requesting the n$^{th}$ encoded packet 510*c*, which UE, 504*c* failed to successfully receive on the network communication interface. Each of UE$_2$ 504*b* and UE, 504*c* may transmit a respective one of the requests 518 on the direct communication interface in order to request information that the two UEs 504*b-c* failed to successfully receive on the network communication interface. That is, each of UE$_2$ 504*b* and UE, 504*c* may transmit a respective one of the requests 518 to directly request a respective one of the first encoded packet 510*a* or the n$^{th}$ encoded packet 510*c*, which serves to indirectly request a subset of the dataset 508 encoded into the first encoded packet 510*a* or the n$^{th}$ encoded packet 510*c*.

Each of the requests 518 may be a non-unicast transmission on the direct communication interface. Although the requests 518 may not necessarily be the same type of non-unicast transmission. For example, UE$_2$ 504*b* may transmit one request 518*a* as a broadcast transmission on the direct communication interface. To that end, UE$_2$ 504*b* may transmit the request 518*a* on a sidelink broadcast channel (SL-BCH), such as a PSBCH, a sidelink control channel (SL-CCH), such as a PSCCH, or another channel that the UEs 504 are configured to monitor during UE-assisted NC communication. In some aspects, UE$_2$ 504*b* may transmit the request 518*a* on a set of resources specified by the configuration 506. For example, such resources may already have been allocated or preconfigured by the base station 502 for the purpose of broadcast or multicast transmissions associated with UE-assisted NC communication, potentially specifically for requests for missing packets on the direct communication interface.

In some other aspects, UE, 504*c* may transmit the other request 518*b* as a multicast transmission. For example, UE, 504*c* may be configured with information (e.g., by the base station 502 through the configuration 506) that indicates other UEs configured for the UE-assisted NC communication, as these may be the only other UEs capable of supplying the missing packet to UE, 504*c*. Therefore, UE, 504*c* may address the other request 518*b* to a multicast address for a group including UE$_1$ 504*a* and UE, 504*c*. UE, 504*c* may transmit the other request 518*b* on one or more sidelink channels, such as a SL-BCH, SL-CCH, or another sidelink channel.

As each of the UEs 504 may be monitoring for messages on the direct communication interface, UE$_1$ 504*a* may receive the request 518*a* from UE$_2$ 504*b* and the other request 518*b* from UE, 504*c*. Similarly, UE, 504*c* may receive the request 518*a* from UE$_2$ 504*b*, and UE$_2$ 504*b* may receive the other request 518*b* from UE, 504*c*.

Upon receiving a message on the direct communication channel requesting transmission of a packet, the recipient UE may determine whether the requested packet exits in locally, and if so, may transmit the packet to the requesting UE as a unicast transmission on the direct communication interface. In the illustrated example, UE$_1$ 504*a* may receive the request 518*a* requesting the first encoded packet 510*a* on the direct communication interface from UE$_2$ 504*b*. When UE$_1$ 504*a* receives the request 518*a*, UE$_1$ 504*a* may extract information identifying the requested packet, such as a packet ID, sequence number, and the like, and may search local and/or remote storage of UE$_1$ 504*a* to determine if the requested packet is accessible and available for distribution.

When UE$_1$ 504*a* locates the first encoded packet 510*a* corresponding to the requested information, UE$_1$ 504*a* may transmit the first encoded packet 510*a* to UE$_2$ 504*b* in order to answer the request. UE$_1$ 504*a* may transmit the first encoded packet 510*a* to UE$_2$ 504*b* in a unicast transmission on the direct communication interface. In some aspects, $UE_1$ 504a may transmit the first encoded packet 510a on a set of resources specified by the configuration 506. For example, these resources may already have been allocated or preconfigured by the base station 502 for the purpose of unicast transmissions associated with UE-assisted NC communication, potentially specifically for requests for responses to requests for missing packets on the direct communication interface.

As the packets being distributed on the direct communication interface for UE-assisted NC communication may be encoded, requested packets are not necessarily contingent upon successfully recovering the original dataset. Therefore, UEs may respond to requests for missing packets while contemporaneously requesting other missing packets. As illustrated, $UE_2$ 504b may receive the other request 518b from $UE_1$ 504c and, in response, may transmit the $n^{th}$ encoded packet 510c to $UE_1$ 504c in a unicast transmission on the direct communication interface.

As with $UE_1$ 504a, $UE_2$ 504b and $UE_1$ 504c may, upon receiving a respective one of the first encoded packet 510a or the $n^{th}$ encoded packet 510c, decode the dataset 508 in the encoded format to recover the dataset 508 without the encoded format (i.e., uncoded dataset). Accordingly, each of the UEs 504 may successfully recover the original dataset 508. One or more of the UEs 504 may be configured to report this successfully recovery to the base station 502.

In some aspects, UEs may be informed of the requests that are being or have already been satisfied. For example, $UE_1$ 504c may, based on monitoring on the direct communication interface for requests, detect or overhear transmission of the first encoded packet 510a to $UE_2$ 504b from $UE_1$ 504a on the direct communication interface, or $UE_1$ 504c may detect or overhear transmission of a report indicating that $UE_1$ 504a supplied a missing packet or indicating that $UE_2$ 504b failed to receive a packet on the network. When a UE is informed that a request is being, or has been, satisfied, then the UE may refrain from responding to that request.

In some aspects, UEs may transmit some additional feedback related to one or more neighboring or other UEs, which may include other UEs to which a missing packet has been transmitted or from which a missing packet has been received. Such information may also serve as feedback to indicate whether a neighboring UE received one or more packets. For example, $UE_1$ 504a may generate a first neighbor report 616a in association with unicast transmission of the first encoded packet 510a to $UE_2$ 504b to show that $UE_2$ 504b has received the first encoded packet 510a. Similarly, $UE_2$ 504b may generate a second neighbor report 616b in association with receiving the first encoded packet 510a and/or in association with unicast transmission of the $n^{th}$ encoded packet 510c.

In some aspects, one or both of the neighbor reports 616 may include information identifying the other UE with which a missed packet was communicated, information identifying the missed packet, whether the other UE acknowledged or non-acknowledged the missing packet on the direct communication interface, and/or other such information. The base station 502 may receive the neighbor reports 616 and may update a log or other information tracking the distribution of the dataset 508 to the recipient UEs. For example, the base station 502 may maintain an internal log reflecting which encoded packets have been acknowledged as being received by which UEs.

In some aspects, the base station 502 may infer or assume that all UEs to which a dataset is transmitted have received an encoded packet into which a subset of the dataset is encoded when the base station 502 receives feedback from at least one of the UEs indicating that encoded packet is successfully received on the network communication interface. The base station 502 may infer this receiver status for all UEs due to the UE-assisted NC communication, as the UE(s) successfully receiving an encoded packet may be configured to distribute that encoded packet on the direct communication interface to other UEs failing to successfully receive the encoded packet on the network communication interface. Such a configuration may eliminate the need for the base station 502 to retransmit NC packets. Therefore, the base station 502 may suppress retransmission of a subset of a dataset when a number of UEs failing to successfully receive the subset of the dataset fails to satisfy a threshold. Potentially, that threshold may be equal to the number of UEs to which the subset of the dataset was transmitted.

In view of the foregoing, retransmissions in NC communication can be assigned to the receivers, such as the UEs 504, in some instances. In other instances, however, the retransmission responsibility may fall back on to the base station 502. Notably, the base station 502 may be responsible for retransmissions when all UEs fail to receive successfully receive a transmission.

By way of illustration, the base station 502 may transmit a second set of encoded packets 610 to the UEs 504. The second set of encoded packets 610 may be another dataset, such as another one or more other packets, and/or the second set of encoded packets 610 may carry include one or more other subsets of the first dataset 508 in the encoded format (in which case, the UEs 504 may wait until the second set of encoded packets 610 is successfully received before recovering the entire dataset 508 without the encoded format).

The base station 502 may transmit the second set of packets 610 as a non-unicast transmission (e.g., broadcast or multicast transmission) on the network communication interface. However, none of the UEs 504 may receive the second set of packets 610. Consequently, none of the UEs 504 is available to send any of the second set of packets 610 to any of the other UEs 504. The base station 502 may identify this condition, for example, when none of the set of packets 610 is acknowledged as successfully received by any of the UEs 504 (e.g., within a certain time period) or when the base station 502 receives feedback from each of the UEs 504 that indicates a non- or negative-acknowledgement, which signifies that the UEs 504 have failed to successfully receive some data or other information transmitted thereto.

In such instances, the base station 502 may determine that the base station 502 is to suspend the configuration UE-assisted NC communication according to which the base station 502 was suppressing retransmissions. Thus, the base station 502 may at least temporarily resume the responsibility of retransmission. The base station 502 may first ensure that the number of UEs that fail to successfully receive the subset of the dataset satisfies (e.g., meets or exceeds) a threshold. In the illustrated aspect, the threshold maybe be equal to the number of UEs that are intended receivers of the packet. In a broadcast scenario then, the intended receivers may include every UE within a coverage area of the base station 502.

Thus, the base station 502 may transmit a retransmission 614b of the non-unicast transmission that included the packets 610. In effect, the base station 502 may retransmit the packets 610 when at least a threshold number of UEs has failed to receive those packets 610. The base station 502 may do so in a non-unicast transmission on the network communication interface, such as with broadcast or multicast. The base station 502 may receive feedback from at least the UEs, and if at least one (or a threshold number) of UEs successfully received the packets 610, then the base station 502 may resume the configuration of UE-assisted NC communication, and expect that if a UE misses a packet on the network communication interface, another UE will supply the missing packets.

However, even with the UE-assistance mechanism to aid in retransmission, a possibility exists the a UE could miss a packet on both the network communication interface and the direct communication interface. For example, if UE, 504c were to be in an environment with a high amount of interference, then UE, 504c may miss the packet on both the network communication interface and direct communication interface. As UE, 504c may fail to acknowledge successful reception of the $n^{th}$ packet 510c, $UE_2$ 504b may be aware that UE, 504c missed that picket. $UE_2$ 504b may transmit the neighbor report 616b in order to indicate to the base station 502 that UE, 504c has not received the $n^{th}$ encoded packet 510c.

Upon receiving the neighbor report 616b reporting that UE, 504c did not receive the $n^{th}$ encoded packet 510c on either the network or the direct communications interfaces, the base station 502 may retransmit the subset of the dataset 508 included in the $n^{th}$ encoded packet 510c, e.g., on the network communications interface. In some aspects, the base station 502 may retransmit the subset of the dataset 508 included in the $n^{th}$ encoded packet 510c by retransmitting the $n^{th}$ encoded packet 510c, which may be received by UE, 504c on the network communication interface.

In some other aspects, the base station 502 may re-encode the subset of the dataset 508 included in the $n^{th}$ encoded packet 510c into one or more new packets. For example, where the base station 502 is still transmitting to the UE, 504c, the base station 502 may identify the subset of the dataset 508 encoded into the $n^{th}$ encoded packet 510c. The base station 502 may then encode that identified subset of the dataset 508 in the encoded format. However, the encoding may be different, e.g., as a different row of the encoding function matrix may be selected and/or the available uncoded subpackets with which to combine the subset of the dataset 508 may be different at the time of the retransmission 614b than at the earlier time of transmission.

From encoding the subset of the dataset 508 the second time, the base station 502 may obtain another encoded packet. The base station 502 may transmit this other encoded packet to UE, 504c on the network interface. For example, the base station 502 may transmit the other encoded packet in a unicast transmission a, a broadcast transmission, or a multicast transmission. UE, 504c may receive the other encoded packet and may use the combination of the to recover the dataset 508.

Figure 7:
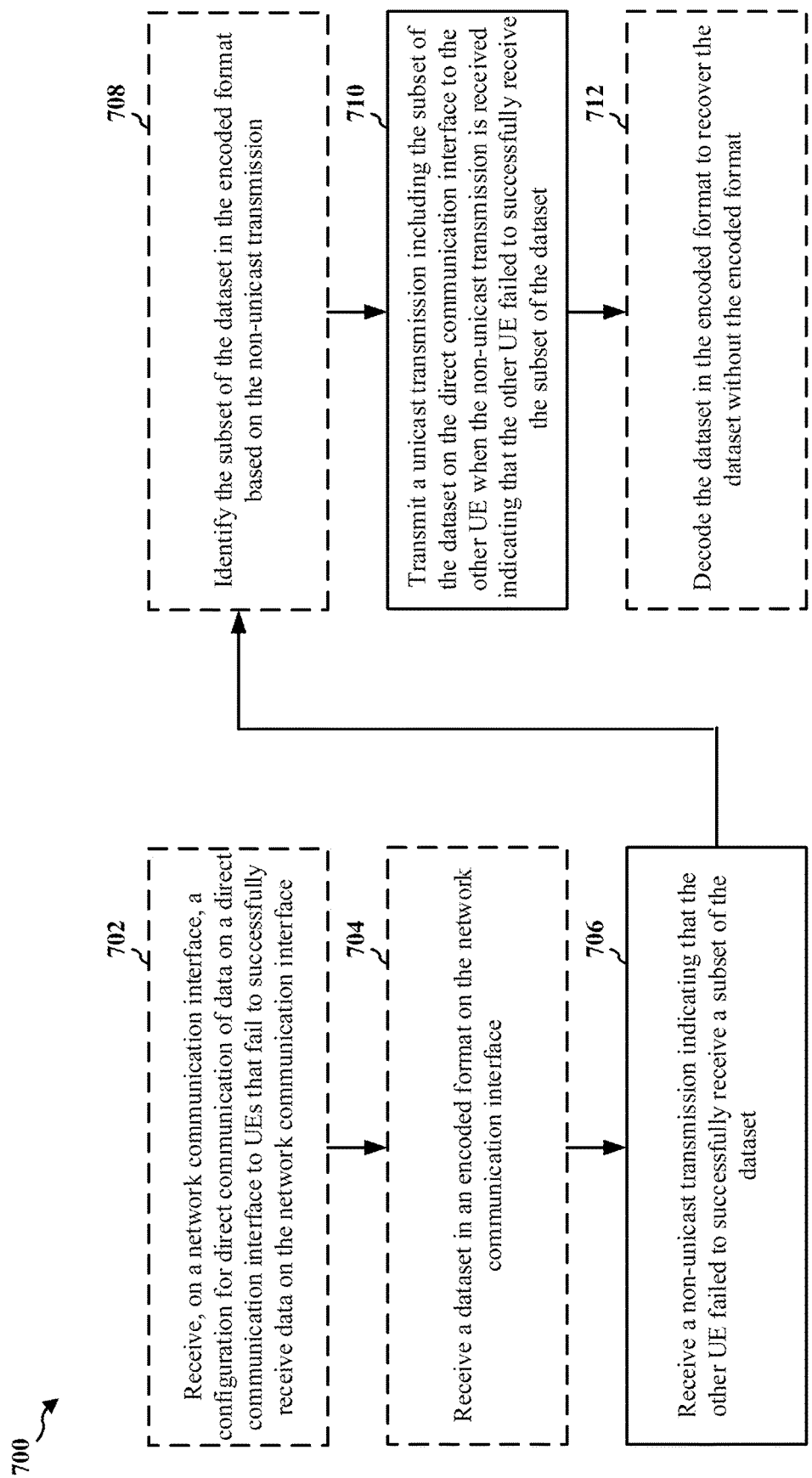
FIG. 7 is a flowchart of a method of wireless communication by a UE transmitting a subset of a dataset to another UE for UE-assisted communication with NC.

FIG. 7 is a flowchart 700 of a method of wireless communication by a UE configured to transmit a subset of a dataset to another UE for UE-assisted communication with NC. The method of FIG. 7 may be practice by or implemented at a UE (e.g., the UE 104', the UE 350, at least one of the UEs 404, at least one of the UEs 504) and/or another apparatus (e.g., the apparatus 1002). According to various aspects of the method shown in FIG. 7, one or more of the illustrated blocks may be transposed, omitted, and/or contemporaneously performed.

At 702, the UE may receive, on a network communication interface, a configuration for communication of data on a direct communication interface to UEs that fail to successfully receive data on the network communication interface. For example, the configuration may indicate at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface. According to various aspects, the network communication interface may include a Uu interface or another interface for at least one of uplink or downlink communication with a base station, and the direct communication interface may include a PC5 interface or another interface for sidelink communication with other UEs.

In the context of FIGS. 5-6, for example, at least one of the UEs 504 may receive the configuration 506, which may specify various parameters associated with NC communication and UE-assisted NC communication. For example, the configuration 506 include information indicating sets of resources to use for UE-assisted NC communication, as well as various NC parameters that may be used to decode encoded data.

At 704, the UE may receive a dataset in an encoded format on the network communication interface. In the encoded format, the dataset may be divided over a number n of encoded packets. However, the dataset itself may be a single packet, or the dataset may include multiple data packets. The encoded format may be a rateless code, such as a fountain coding (including LT and Raptor code). The UE may receive the dataset in at least one of a broadcast transmission or a multicast transmission.

In the context of FIGS. 5-6, for example, $UE_1$ 504a may receive the encoded packets 510, which may carry the dataset 508 in the encoded format, on the network communication interface. $UE_1$ 504a may receive the encoded packets 510 from the base station 502 in a non-unicast transmission 614a, which may be a broadcast or multicast transmission.

At 706, the UE may receive a non-unicast transmission from another UE indicating that the other UE failed to successfully receive a subset of the dataset. The non-unicast transmission may be a broadcast transmission or a multicast transmission. Further, the non-unicast transmission may be received on the direct communication interface, for example, on a sidelink channel.

In the context of FIGS. 5-6, for example, $UE_1$ 504a may receive the request 518a from $UE_2$ 504b. The request 518a may include a request for the first encoded packet 510a carrying a subset of the dataset 508 in the encoded format. $UE_1$ 504a may receive the request 518a from $UE_2$ 504b in a non-unicast transmission, which may be a broadcast or multicast transmission, on a sidelink channel on the direct communication interface.

At 708, the UE may identify the subset of the dataset in the encoded format based on the non-unicast transmission. For example, the non-unicast transmission may include information identifying the subset of the dataset in the encoded format, and first, the UE may extract such identifying information from the non-unicast transmission, the UE may then compare at least a portion of the identifying information with information stored by the UE for the encoded packets the UE either has decoded and not yet discarded or has not decoded and is still buffering. In some aspects, the UE may be configured with a delay buffer that prevents the UE from immediately discarding packets upon successfully decoding them. For example, in association with UE-assisted NC communication, the UE may be configured with a buffer that causes the UE to buffer packets after the UE has finished decoding so that the encoded packets remain available at the UE for the UE-assisted NC communication.

In the context of FIGS. 5-6, for example, $UE_1$ 504a may identify the first encoded packet 510a, which may carry the subset of the dataset 508 in the encoded format, based on the request 518a received from $UE_2$ 504b. The request 518a may include information that $UE_1$ 504a may use to identify the first encoded packet 510a.

At 710, the UE may transmit a unicast transmission including the identified subset of the dataset on the direct communication interface to the other UE. Thus, the UE may transmit such a unicast transmission on the direct communication interface in response to receiving the non-unicast transmission indicating that the other UE failed to successfully receive the subset of the dataset. The UE may transmit the subset of the dataset to the other UE in the encoded format, such as by transmitting an encoded packet. The UE may transmit the unicast transmission based on the configuration received on the network communication interface. For example, the UE may transmit the unicast transmission on a set of resources specified by the configuration.

In the context of FIGS. 5-6, for example, $UE_1$ 504a may transmit a unicast transmission including the first encoded packet 510a (carrying the subset of the dataset 508) on the direct communication interface to $UE_2$ 504b. $UE_1$ 504a may transmit the unicast transmission based on the configuration 506 received on the network communication interface — e.g., $UE_1$ 504a may transmit the first encoded packet 510a on resources specified by the configuration 506.

At 712, the UE may decode the dataset in the encoded format to recover the dataset without the encoded format. According to various aspects, the dataset in the encoded format is encoded with a rateless code, and therefore, the UE may decode the dataset using a decoder configured for the rateless code. The UE may decode the dataset in the encoded format based on the configuration received on the network communication interface.

In some aspects, the UE may decode the dataset in the encoded format by implementing a belief propagation algorithm or other NC decoding algorithm, e.g., in which the original dataset is divided into k subpackets and encoded into n packets, which may be treated as symbols during decoding. For example, first, the UE may perform a release operation in which the UE releases all encoding symbols of degree one to cover a (unique) neighbor (e.g., degree-one symbols may be uncoded subpackets or other symbols having a single uncoded neighbor or other symbol). Second, the UE may perform a cover operation, e.g., in which the UE sends the covered but not yet processed input symbols to the ripple, which may include a set of covered unprocessed information symbols gathered through previous iterations, and the released encoding symbols may respectively cover unique neighbor information symbols. Third, the UE may perform a process operation, e.g., in which the UE chooses one information symbol in the ripple to process, with the edges connecting the information symbol to its neighbor encoding symbols are removed and the value of each encoding symbol changes according to the information symbols, and the UE then removes the processed information symbol from the ripple.

In the context of FIGS. 5-6, for example, $UE_1$ 504a may decode the encoded packets 510 (carrying the dataset 508 in the encoded format) to recover the dataset 508 without the encoded format. According to various aspects, the dataset 508 in the encoded format is encoded with a rateless code, and therefore, $UE_1$ 504a may decode the dataset 508 using a decoder configured for the rateless code. $UE_1$ 504a may decode the dataset 508 in the encoded format based on the configuration 506 received on the network communication interface.

Figure 8:
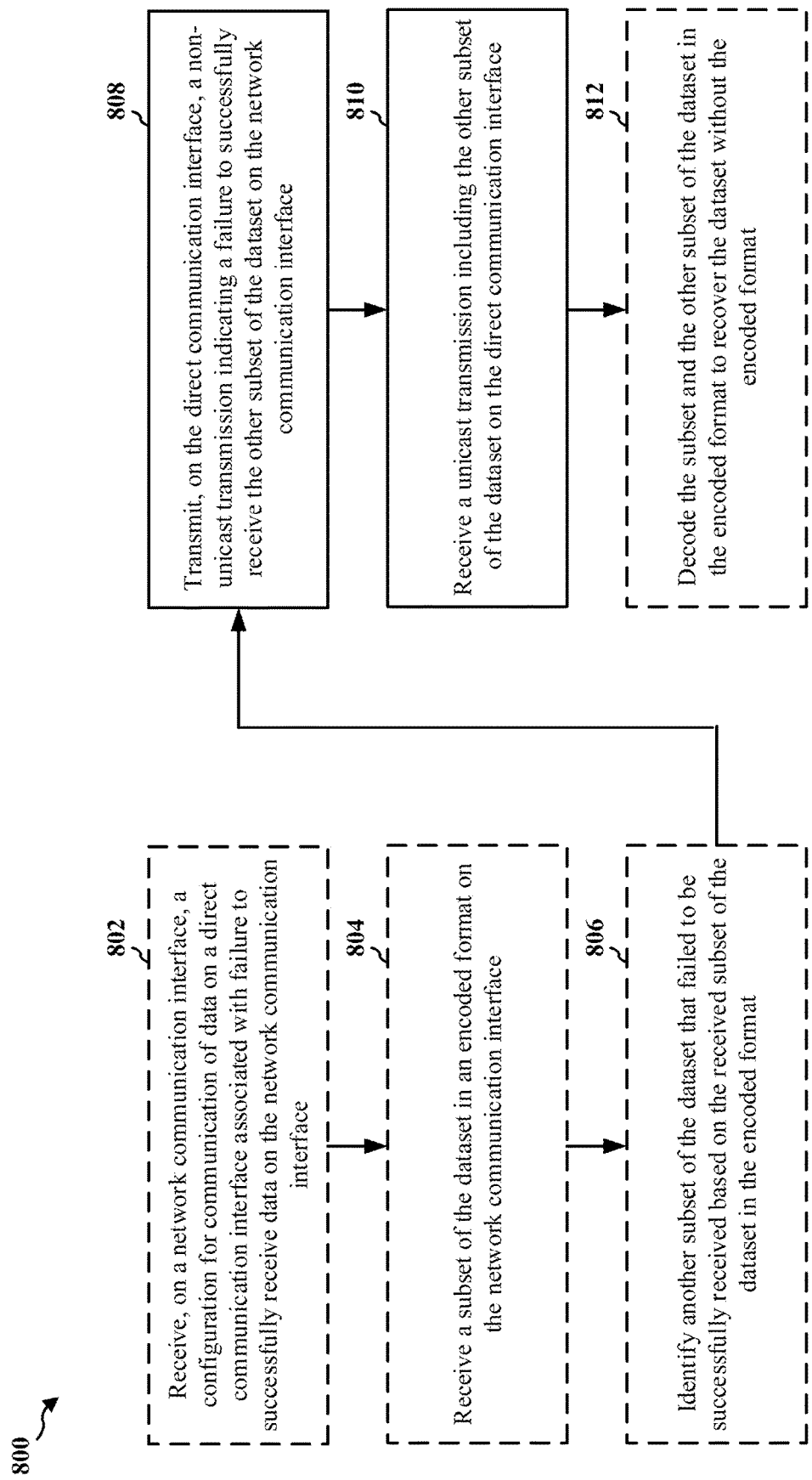
FIG. 8 is a flowchart of a method of wireless communication by a UE receiving a subset of a dataset from another UE for UE-assisted communication with NC.

FIG. 8 is a flowchart 800 of a method of wireless communication by a UE configured to receive a subset of a dataset from another UE for UE-assisted communication with NC. The method may be performed by a UE (e.g., the UE 104, the UE 350, at least one of the UEs 404, at least one of the UEs 504) and/or another apparatus (e.g., the apparatus 1002). According to various aspects of the method shown in FIG. 8, one or more of the illustrated blocks may be transposed, omitted, and/or contemporaneously performed.

At 802, the UE may receive, on the network communication interface, a configuration for communication of data on a direct communication interface associated with failure to successfully receive data on the network communication interface. For example, the configuration may indicate at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface. According to various aspects, the network communication interface may include a Uu interface or another interface for at least one of uplink or downlink communication with a base station, and the direct communication interface may include a PC5 interface or another interface for sidelink communication with other UEs.

In the context of FIGS. 5-6, for example, at least one of the UEs 504, such as $UE_2$ 504b, may receive the configuration 506, which may specify various parameters associated with NC communication and UE-assisted NC communication. For example, the configuration 506 include information indicating sets of resources to use for UE-assisted NC communication, as well as various NC parameters that may be used to decode encoded data.

At 804, the UE may receive a subset of a dataset in an encoded format on the network communication interface. In the encoded format, the dataset may be divided over a number n of encoded packets. However, the dataset itself may be a single packet, or the dataset may include multiple data packets. The encoded format may be a rateless code, such as a fountain coding (including LT and Raptor code). The UE may receive the dataset in at least one of a broadcast transmission or a multicast transmission. The subset of the dataset in the encoded format may be incomplete, and therefore, the UE may not have received a sufficient amount of the dataset to recover the dataset without the encoded format. For example, if the dataset is encoded into a set of packets so that each encoded packet of the set is necessary to recover the uncoded dataset, the UE may receive a subset of a set of encoded packets, which may prevent the UE from recovering the uncoded dataset until the remainder of the set of encoded packets is obtained.

In the context of FIGS. 5-6, for example, $UE_2$ 504b may receive the second encoded packet 510b through the $n^{th}$ encoded packet 510c, which may carry a subset of the dataset 508 in the encoded format, on the network communication interface. However, $UE_2$ 504b may fail to successfully receive the first encoded packet 510a. In some aspects, $UE_2$ 504b may receive the second encoded packet 510b through the n$^{th}$ encoded packet 510c in a non-unicast transmission 614a, which may be a broadcast or multi cast transmission.

At 806, the UE may identify another subset of the dataset in the encoded format that failed to be successfully received. The UE may identify the other subset of the dataset in the encoded format based on the received subset of the dataset. For example, the UE may determine that the UE has failed to successfully receive the other subset of the dataset, and therefore, the original dataset cannot be recovered without obtaining the missing subset. Illustratively, the UE may determine that a subset of packets is missing from a set of packets into which the dataset is encoded by examining the received packets (e.g., headers) and respective identifying information indicating a sequence number or similar ordering information for each packet. The UE may expect packets to follow a sequential order, such as a consecutive increment; however, the UE may determine that the packets received by the UE do not contain identifying information that is consistent with the sequential ordering. For example, packets may be expected to contain a sequence ID that increases by a fixed scale (e.g., increases by one) between any two consecutive packets, and the UE may detect that the fixed scale is not reflected by two packets; therefore, the UE may determine that a subset of packets is missing in order for that fixed scale to be reflected across all packets of the set.

In the context of FIGS. 5-6, for example, UE$_2$ 504b may identify the first encoded packet 510a, carrying the subset of the dataset 508 in the encoded format, is missing from the sequence of the second through n$^{th}$ encoded packets 510b-c. UE$_2$ 504b may identify the first encoded packet 510a failed to be successfully received based on successfully receiving the second through n$^{th}$ encoded packets 510b-c.

At 808, the UE may transmit, on the direct communication interface, a non-unicast transmission indicating a failure to successfully receive the other subset of the dataset on the network communication interface. In some aspects, the non-unicast transmission may include information identifying the other subset of the dataset in the encoded format, e.g., as identified by the UE. For example, the non-unicast transmission may identify at least one encoded packet that the UE failed to successfully receive on the network communication interface. The non-unicast transmission may be a broadcast transmission or a multicast transmission. Further, the non-unicast transmission may be transmitted on the direct communication interface, for example, on a sidelink channel.

The UE may transmit the non-unicast transmission based on the configuration received on the network communication interface. In one example, the UE may transmit the non-unicast transmission on resources specified by the configuration. In another example, if the other subset of the dataset has not been received, the UE may retransmit the non-unicast transmission after a period of time specified by the configuration.

In the context of FIGS. 5-6, for example, UE$_2$ 504b may transmit the request 518a on the direct communication interface, e.g., such as by broadcasting the request, which allows UE$_2$ 504b to receive the request 518a. The request 518a may include a request for the first encoded packet 510a carrying a subset of the dataset 508 in the encoded format. UE$_2$ 504b may transmit the request 518a in a non-unicast transmission, which may be a broadcast or multicast transmission, on a sidelink channel on the direct communication interface.

At 810, the UE may receive a unicast transmission including the subset of the dataset on the direct communication interface. The UE may receive such a unicast transmission on the direct communication interface in response to transmitting the non-unicast transmission indicating the failure to successfully receive the subset of the dataset. The UE may receive the subset of the dataset in the encoded format, such as by receiving an encoded packet. The UE may receive the unicast transmission based on the configuration received on the network communication interface. For example, the UE may receive the unicast transmission on a set of resources specified by the configuration.

In some aspects, the UE may be configured to transmit the received subset of the dataset in a unicast transmission on the direct communication interface after receiving the subset of the dataset in another unicast transmission on the direct communication interface. Thus, the range and distribution of UE-assisted NC communication may be increased, as missed subsets may be propagated over second-, third-, fourth-hop neighbors (or even beyond) to reach all the intended UEs.

In the context of FIGS. 5-6, for example, UE$_2$ 504b may receive a unicast transmission including the first encoded packet 510a (carrying the subset of the dataset 508) on the direct communication interface from UE$_1$ 504a. UE$_2$ 504b may receive the unicast transmission based on the configuration 506 received on the network communication interface—e.g., UE$_2$ 504b may receive the first encoded packet 510a on resources specified by the configuration 506.

At 812, the UE may decode the subset and the other subset of the dataset in the encoded format to recover the dataset without the encoded format. According to various aspects, the dataset in the encoded format is encoded with a rateless code, and therefore, the UE may decode the dataset using a decoder configured for the rateless code. The UE may decode the dataset in the encoded format based on the configuration received on the network communication interface.

In some aspects, the UE may decode the dataset in the encoded format by implementing a belief propagation algorithm or other NC decoding algorithm, e.g., in which the original dataset is divided into k subpackets and encoded into n packets, which may be treated as symbols during decoding. For example, first, the UE may perform a release operation in which the UE releases all encoding symbols of degree one to cover a (unique) neighbor (e.g., degree-one symbols may be uncoded subpackets or other symbols having a single uncoded neighbor or other symbol). Second, the UE may perform a cover operation, e.g., in which the UE sends the covered but not yet processed input symbols to the ripple, which may include a set of covered unprocessed information symbols gathered through previous iterations, and the released encoding symbols may respectively cover unique neighbor information symbols. Third, the UE may perform a process operation, e.g., in which the UE chooses one information symbol in the ripple to process, with the edges connecting the information symbol to its neighbor encoding symbols are removed and the value of each encoding symbol changes according to the information symbols, and the UE then removes the processed information symbol from the ripple.

In the context of FIGS. 5-6, for example, UE$_2$ 504b may decode the first encoded packet 510a and the second through the n$^{th}$ encoded packets 510b-c in order to recover the dataset 508 without the encoded format. According to various aspects, the dataset 508 in the encoded format is encoded with a rateless code, and therefore, UE$_2$ 504b may decode the dataset 508 using a decoder configured for the rateless code. UE₂ 504b may decode the dataset 508 in the encoded format based on the configuration 506 received on the network communication interface.

Figure 9:
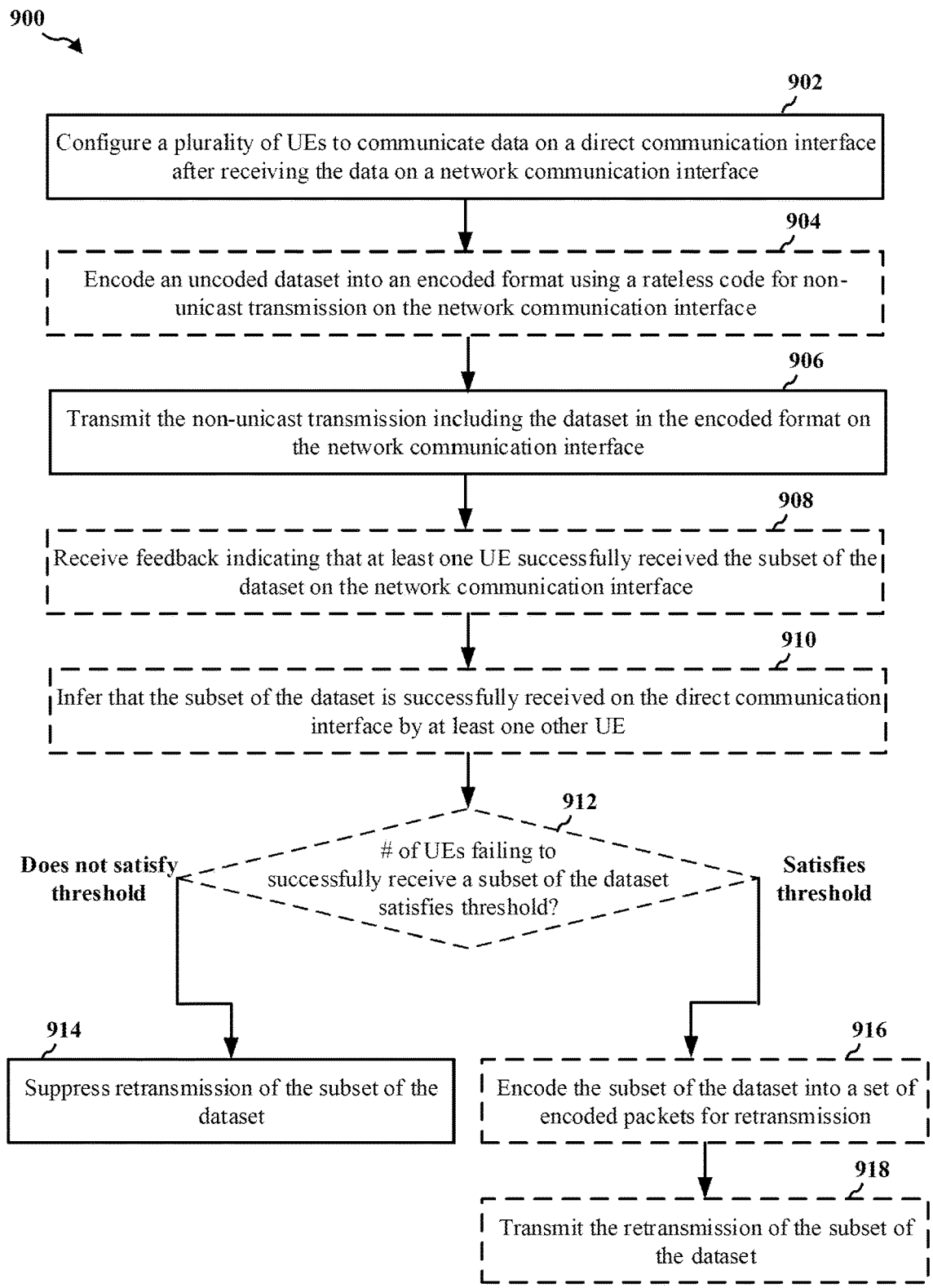
FIG. 9 is a flowchart of a method of wireless communication by a base station transmitting a subset of a dataset to another UE for UE-assisted communication with NC.

FIG. 9 is a flowchart 900 of a method of wireless communication by a base station that configures UE-assisted communication with NC. The method may be performed by a base station (e.g., the base station 102/180, the base station 310, the base station 402, the base station 502) and/or another apparatus (e.g., the apparatus 1102). According to various aspects of the method shown in FIG. 9, one or more of the illustrated blocks may be transposed, omitted, and/or contemporaneously performed.

At 902, the base station may configure a plurality of UEs to communicate data on a direct communication interface after receiving data on a network communication interface. For example, the base station may configure the plurality of UEs for UE-assisted NC communication. The base station may allocate (or pre-allocate) at least one set of resources associated with UE-assisted NC communication, such as a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data transmitted on the network communication interface. The base station may transmit configuration information on the network communication interface, which may indicate one or more of the preceding sets of resources.

In the context of FIGS. 5-6, for example, the base station 502 may configure the UEs 504 for NC communication, which may include configuring the UEs 504 for UE-assisted NC communication. The base station 502 may configure the UEs 504 by transmitting the configuration 506, which may specify various parameters associated with NC communication and UE-assisted NC communication. For example, the configuration 506 include information indicating sets of resources to use for UE-assisted NC communication, as well as various NC parameters that may be used to decode encoded data. The base station 502 may transmit the configuration to the UEs 504 on the network communication interface.

At 904, the base station may encode an uncoded dataset into an encoded format using a rateless code for non-unicast transmission on the network communication interface. For example, the base station may divide the uncoded dataset into k subpackets, and the base station may select a combination of subpackets for each transmission instance using an encoding function with a random or pseudorandom matrix. In some aspects, the dataset itself may be a single packet, or the dataset may include multiple data packets. The encoded format may be a NC format and/or may be include rateless code, such as fountain coding (e.g., including LT and Raptor code). A rateless code may be any channel code without a fixed code rate used for encoding data to generate incremental redundancy codes.

In the context of FIGS. 5-6, for example, the base station 502 may encode the uncoded dataset 508 into an encoded format using a rateless code for non-unicast transmission on the transmission on the network communication interface. The base station 502 may divide the dataset 508 into k subpackets, which may be uncoded, and the base station 502 may packetize the k subpackets into n encoded packets 510.

UE₂ 504b may receive the second encoded packet 510b through the n$^{th}$ encoded packet 510c, which may carry a subset of the dataset 508 in the encoded format, on the network communication interface. However, UE₂ 504b may fail to successfully receive the first encoded packet 510a. In some aspects, UE₂ 504b may receive the second encoded packet 510b through the n$^{th}$ encoded packet 510c in a non-unicast transmission 614a, which may be a broadcast or multicast transmission.

At 906, the base station may transmit the non-unicast transmission including the dataset in an encoded format on the network communication interface. For example, the dataset in the encoded format may include a set of encoded packets into which the dataset is encoded. The non-unicast transmission may be a broadcast or multicast transmission, for example, on a downlink channel. Thus, while the base station may transmit the non-unicast transmission to UEs, the base station may address the non-unicast transmission to a broadcast address or a multicast address of a group including the UEs.

In the context of FIGS. 5-6, for example, the base station 502 may transmit the n encoded packets 510, carrying the dataset 508 in the encoded format, on the network communication interface.

At 908, the base station may receive feedback indicating that at least one UE successfully received the subset of the dataset on the network communication interface. For example, the feedback may include at least one of a PDCP status report, an RLC status report, ARQ feedback indicating ACK or NACK, or HARQ feedback indicating ACK or NACK. In some aspects, the feedback may indicate the feedback is received from one UE and the feedback indicates that another UE failed to successfully receive the subset of the dataset on the direct communication interface and on the network communication interface.

In the context of FIGS. 5-6, for example, the base station 502 may receive at least one of the feedback 516 or the neighbor report 616. The base station may receive information in at least one of the feedback 516 indicating that UE₂ 504b and UE, 504c failed to successfully receive the non-unicast transmission. In some aspects, the base station may receive information in at least one of the feedback indicating that UE₁ 504a transmitted the first encoded packet 510a to UE₂ 504b. If UE₂ 504b fails to receive information on both the network communication interface, then the base station 502 may receive, from UE₁ 504a, information indicating that UE₂ 504b did not receive the packet on direct communication interface, in addition to the network communication interface.

At 910, the base station may infer that at least a subset of the dataset is successfully received on the direct communication interface. That is, the base station may assume that the UEs will follow the configuration for UE-assisted NC communication, including responding to requests on the direct communication interface for missed packets. Therefore, if the at least one UE has received an (encoded) packet, the base station may interpret that to mean that multiple UEs have received that (encoded) packet because that UE will have transmitted the packet to the other UEs that did not receive the packet on the network communication interface. For each packet then, the base station may detect whether at least one UE has received the packet (on the network interface), e.g., based on the received feedback, and the base station may determine that at least one other UE failed to successfully receive the same packet on the network interface. The base station may store information indicating that the other UE received that packet regardless, however, because the base station may assume that the at least one UE will transmit (or has transmitted) a unicast transmission including the packet to the other UE on the direct communication interface.

In the context of FIGS. 5-6, for example, the base station 502 may infer that the first encoded packet 510a, carrying at least a subset of the dataset, is successfully received on the direct communication interface by $UE_2$ 504b, because $UE_1$ 504a transmitted feedback 516a indicating that $UE_1$ 504a successfully received the first encoded packet 510a.

At 912, the base station may determine whether the number of UEs failing to successfully receive the same subset of the dataset satisfies a threshold. For example, for a given packet carrying a subset of the dataset, the base station may determine if at least one UE has transmitted feedback acknowledging successful reception of the given packet. If the base station finds at least one UE has acknowledged successfully receiving the given packet, the base station may infer that some or all other UEs that failed to successfully receive the given packet on the network communication interface have successfully received the packet on the direct communication interface, either from the at least one UE that successfully received the given packet on the network communication interface or from another UE that successfully received the given packet on the direct communication interface. Thus, the base station may assume that the threshold is not satisfied. In some aspects, the base station may assume that every UE has received the given packet unless the base station receives feedback from one UE indicating that another UE failed to acknowledge successfully receiving the given packet on the direct communication interface.

In some aspects, the threshold may be equal to all UEs that are intended recipients of a given packet. That is, the threshold may be satisfied when none of the UEs acknowledge successfully receiving a given packet. In some other aspects, the threshold may be equal to a percentage of all UEs that are intended recipients. For example, the threshold may be satisfied when seventy-five percent or ninety percent of the intended recipient UEs fail to successfully receive a given packet on the network communication interface.

In some aspects, the base station may determine that the threshold is satisfied when the number of UEs failing to successfully receive the same subset of a dataset meets or exceeds the threshold. Therefore, the base station may determine that the threshold is not satisfied when the number of UEs failing to successfully receive the same subset of a dataset is less than the threshold. However, different implementations may be employed without departing from the scope of the present disclosure. For example, the base station may determine that the number of UEs failing to successfully receive the subset of the dataset satisfies the threshold when the base station receives feedback indicating that one or more UEs has failed to receive the subset of the dataset on both the network communication interface and the direct communication interface.

In the context of FIGS. 5-6, for example, the base station 502 may determine whether the number of the UEs 504 failing to successfully receive the second set of packets 610 (carrying a subset of the dataset) satisfies a threshold, which may be equal to the number i of UEs 504 that are intended recipients of the second set of packets 610. As the base station 502 does not receive feedback from any of the UEs acknowledging successful reception of any of the second set of packets 610, the base station 502 may assume that all UEs 504 have failed to successfully receive the second set of packets 610 and so the threshold may be satisfied.

If the base station determines that the number of UEs failing to successfully receive a subset of the dataset does not satisfy a threshold (at 912), then the base station may (at 914):

At 914, the base station may suppress retransmission of the subset of the dataset on the network communication interface. For example, the base station may assume that another UE will supply any subsets of the dataset on a direct communication link, and so the base station may refrain from retransmitting subsets of the dataset on the network communication interface where one or more UEs has acknowledged successfully receiving the subsets.

In the context of FIGS. 5-6, for example, the base station 502 may suppress retransmission of the first and $n^{th}$ encoded packets 510a, 510c (e.g., carrying a subset of the dataset 508) on the network communication interface, e.g., even where the base station 502 receives NACK feedback from $UE_2$ 504b and $UE_i$ for the first and $n^{th}$ encoded packets 510a, 510c, respectively, because the base station 502 may assume that another of the UEs will supply the missing packets.

If the base station determines that the number of UEs failing to successfully receive a subset of the dataset satisfies a threshold (at 912), then the base station may (at 916):

At 916, the base station may encode the subset of the dataset into a set of encoded packets for retransmission. In some aspects, the base station may encode the subset of the dataset into the set of encoded packets for retransmission differently from another set of encoded packets into which the subset of the dataset is encoded for the non-unicast transmission. For example, the base station may combine a subpacket into which the dataset has be divided for retransmission with one or more other subpackets different from those with which the subpacket was combined for the earlier non-unicast transmission. The base station may determine which subset of a dataset all UEs have failed to successfully receive, such as by determining a subset of the dataset that corresponds to an encoded packet that none of the UEs has acknowledged is successfully received. The UE may then encode the subset of the dataset for retransmission.

In the context of FIGS. 5-6, for example, the base station 502 may encode the subset of the dataset into a set of encoded packets for retransmission. For example, the base station may combine respective subpackets from the encoded packets 610 into another set of encoded packets that is different from the encoded packets 610.

At 918, the base station may transmit a retransmission of the subset of the dataset when the number of UEs failing to successfully receive the subset of the dataset fails to satisfy the threshold. In some aspects, the base station may retransmit the same packets as the base station earlier transmitted. That is, the base station may include, in the non-unicast transmission, a set of encoded packets having the subset of the dataset in the encoded format, and then the base station may include, in the retransmission of the subset of the dataset, the same set of encoded packets having the subset of the dataset in the encoded format. In some other aspects, the base station may retransmit the subset of the dataset in encoded packets that are different from those included in the non-unicast transmission. For example, the subset of the dataset may be combined with subpackets for the retransmission that are different from those with which the subset had been previously combined for the non-unicast transmission.

In the context of FIGS. 5-6, for example, the base station 502 may transmit a retransmission of the subset of the dataset when the number of UEs failing to successfully receive the second set of packets 610 fails to satisfy the threshold.

Figure 10:
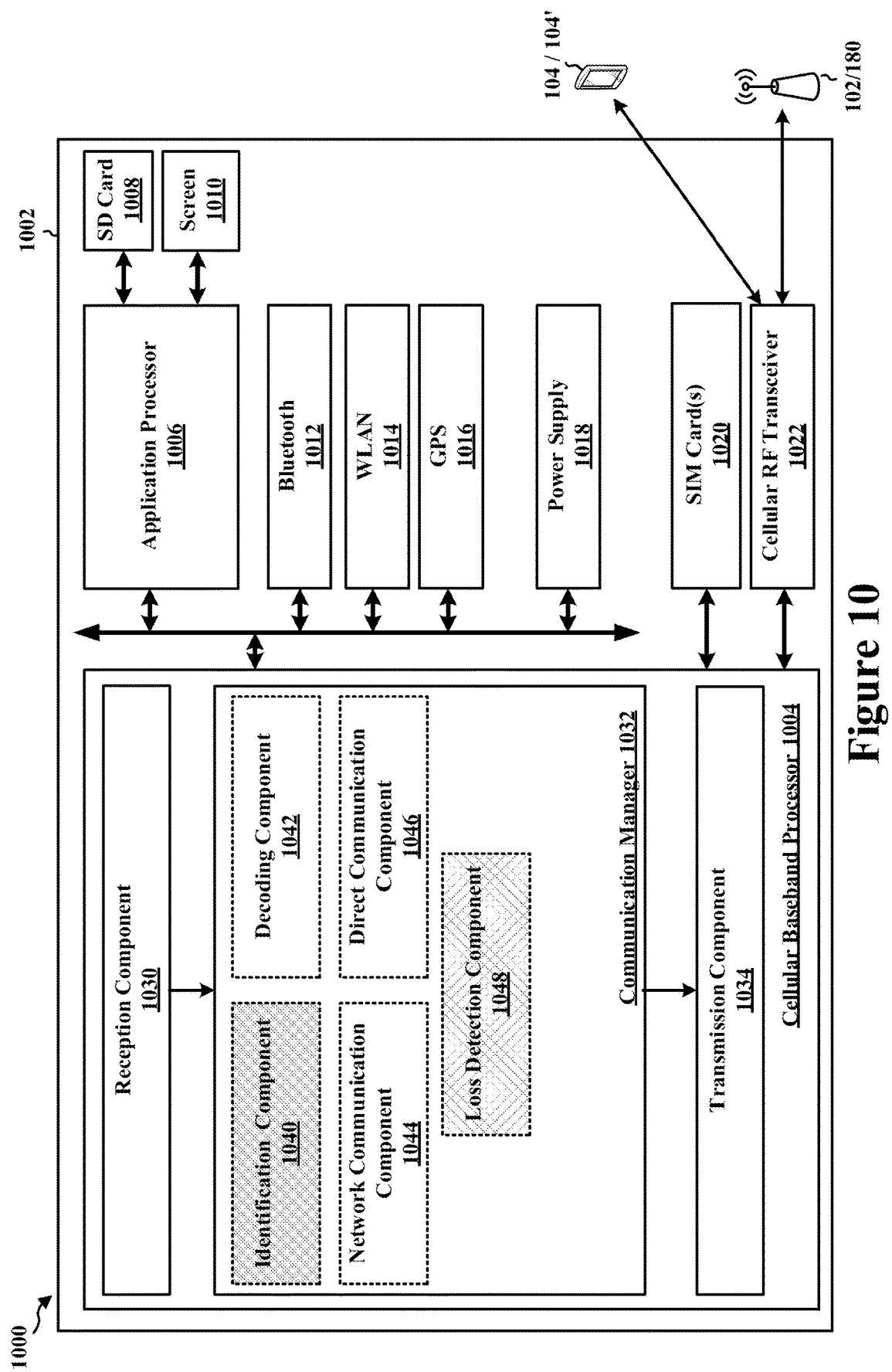
FIG. 10 is a diagram illustrating an example of a hardware implementation for at least one example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or base station 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004.

In the context of FIG. 3, the cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., the UE 350 of FIG. 3) and include the aforementioned additional modules of the apparatus 1002. In one configuration, the cellular RF transceiver 1022 may be implemented as at least one of the transmitter 354TX and/or the receiver 354RX.

Further, both the reception component 1030 and the transmission component 1034 may be communicatively coupled one or both of a network communication component 1044 and/or a direct communication component 1046. The network communication component 1044 may be responsible for RAN communication, such as communication on an air interface or network communication interface with the base station 102/180. The direct communication component 1046 may coordinate with the network communication component 1044 and manage sidelink communication or other communication on a direct link between two devices that does not traverse a RAN entity, which may occur on a direct communication interface.

The communication manager 1032 may include one or more components configured for various operations commensurate with UE-assisted NC communication. In some implementations, the communication manager 1032 is configured with an identification component 1040 (as further described, infra), which may enable unicast transmission of data in an encoded format to a UE 104 requesting such data in the encoded format. In some other implementations, the communication manager 1032 is configured with a loss detection component 1048 (as further described, infra), which may enable non-unicast transmission of requests for data in an encoded format on a direct communication interface so that a UE 104' may receive the request and respond with such data in the encoded format. In still other implementations, the communication manager 1032 includes both the identification component 1040 and the loss detection component 1048, as the communication manager 1032 may be configured to both assist and be assisted with NC communication.

In some configurations, the network communication component 1044 may be configured to receive (e.g., through the reception component 1030), on the network communication interface, a configuration for communication of data on the direct communication interface to UEs that fail to successfully receive data on the network communication interface, e.g., as described in connection with 702 of FIG. 7. For example, the configuration may indicate at least one of a first set of resources allocated for non-unicast transmissions indicating data that is unsuccessfully received on the network communication interface, a second set of resources on the direct communication interface allocated for unicast transmissions of data received on the network communication interface, or a third set of resources on the network communication interface allocated for uplink feedback reporting for data received on the network communication interface. According to various aspects, the network communication interface may include a Uu interface or another interface for at least one of uplink or downlink communication with a base station, and the direct communication interface may include a PC5 interface or another interface for sidelink communication with other UEs.

In some configurations, the network communication component 1044 may be further configured to receive (e.g., through the reception component 1030) a dataset in an encoded format on the network communication interface, e.g., as described in connection with 704 of FIG. 7. The encoded format may include a rateless code, such as a fountain coding (e.g., LT code, Raptor code, online code). The dataset may be received in at least one of a broadcast transmission or a multicast transmission.

In some configurations, the network communication component 1044 may be further configured to receive (e.g., through the reception component 1030) a non-unicast transmission from a UE 104 indicating that the UE 104 failed to successfully receive a subset of the dataset, e.g., as described in connection with 706 of FIG. 7. In the encoded format, the dataset may be divided over a number n of encoded packets. The non-unicast transmission may be a broadcast transmission or a multicast transmission. Further, the non-unicast transmission may be received on the direct communication interface, for example, on a sidelink channel.

In some configurations, the communication manager 1032 may include an identification component 1040. The identification component 1040 may be configured to identify the subset of the dataset in the encoded format based on the non-unicast transmission, e.g., as described in connection with 708 of FIG. 7. For example, the non-unicast transmission may include information identifying the subset of the dataset in the encoded format.

In some configurations, the direct communication component 1046 may be configured to transmit (e.g., through the transmission component 1034) a unicast transmission including the identified subset of the dataset on the direct communication interface to the UE 104, e.g., as described in connection with 710 of FIG. 7. The direct communication component 1046 may transmit such a unicast transmission on the direct communication interface in response to receiving the non-unicast transmission indicating that the UE 104 failed to successfully receive the subset of the dataset. The direct communication component 1046 may transmit the subset of the dataset to the UE 104 in the encoded format, such as by transmitting an encoded packet. The direct communication component 1046 may transmit the unicast transmission based on the configuration received on the network communication interface. For example, the direct communication component 1046 may transmit the unicast transmission on a set of resources specified by the configuration.

In some configurations, the communication manager 1032 may further include a decoding component 1042 that may be configured to decode the dataset in the encoded format to recover the dataset without the encoded format, e.g., as described in connection with 712 of FIG. 7. According to various aspects, the dataset in the encoded format is encoded with a rateless code, and therefore, the decoding component 1042 may decode the dataset using a decoder configured for the rateless code. The decoding component 1042 may decode the dataset in the encoded format based on the configuration received on the network communication interface. In some aspects, the decoding component 1042 may decode the dataset in the encoded format by implementing a belief propagation algorithm or other NC decoding algorithm.

In some other configurations, the network communication component 1044 may be configured to receive (e.g., through the reception component 1030), on the network communication interface, a configuration for communication of data on the direct communication interface associated with failure to successfully receive data on the network communication interface, e.g., as described in connection with 802 of FIG. 8. For example, the configuration may indicate at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface. According to various aspects, the network communication interface may include a Uu interface or another interface for at least one of uplink or downlink communication with a base station, and the direct communication interface may include a PC5 interface or another interface for sidelink communication with other UEs.

In some other configurations, the network communication component 1044 may be further configured to receive (e.g., through the reception component 1030) a subset of a dataset in an encoded format on the network communication interface, e.g., as described in connection with 804 of FIG. 8. In the encoded format, the dataset may be received from the base station 102/180 divided over a number n of encoded packets. However, the dataset itself may be a single packet, or the dataset may include multiple data packets. The encoded format may be a rateless code, such as a fountain coding (e.g., LT code, Raptor code, online code, etc.). The network communication component 1044 may receive the dataset in at least one of a broadcast transmission or a multicast transmission.

In some other configurations, the loss detection component 1048 may be configured to identify another subset of the dataset in the encoded format that failed to be successfully received, e.g., as described in connection with 806 of FIG. 8. The loss detection component 1048 may identify the other subset of the dataset in the encoded format based on the received subset of the dataset.

In some other configurations, the direct communication component 1046 may transmit (e.g., through the transmission component 1034), on the direct communication interface, a non-unicast transmission indicating a failure to successfully receive the other subset of the dataset on the network communication interface, e.g., as described in connection with 808 of FIG. 8. The non-unicast transmission may include information identifying the other subset of the dataset in the encoded format, e.g., as identified by the loss detection component 1048. The non-unicast transmission may be a broadcast transmission or a multicast transmission. Further, the non-unicast transmission may be transmitted on the direct communication interface, for example, on a sidelink channel. The direct communication component 1046 may transmit (e.g., through the transmission component 1034) the non-unicast transmission based on the configuration received on the network communication interface. In one example, the UE may transmit the non-unicast transmission on resources specified by the configuration.

In some other configurations, the direct communication component 1046 may receive (e.g., through the reception component 1030) a unicast transmission including the subset of the dataset on, e.g., as described in connection with 810 of FIG. 8. The UE may receive such a unicast transmission on the direct communication interface in response to transmitting the non-unicast transmission indicating the failure to successfully receive the subset of the dataset.

In some other configurations, the decoding component 1042 may decode the subset and the other subset of the dataset in the encoded format to recover the dataset without the encoded format. According to various aspects, the dataset in the encoded format is encoded with a rateless code, and therefore, the UE may decode the dataset using a decoder configured for the rateless code. The UE may decode the dataset in the encoded format based on the configuration received on the network communication interface. In some aspects, the UE may decode the dataset in the encoded format by implementing a belief propagation algorithm or other NC decoding algorithm, e.g., as described in connection with 812 of FIG. 8.

The apparatus 1002 may include additional components that perform some or all of the blocks, operations, signaling, etc. of the algorithm(s) in the aforementioned call flow diagram 600 of FIG. 6 and/or flowcharts 700, 800 of FIGS. 7 and 8. As such, some or all of the blocks, operations, signaling, etc. in the aforementioned call flow diagram 600 of FIG. 6 and/or flowcharts 700, 800 of FIGS. 7 and 8 may be performed by a component, and the apparatus 1002 may include one or more of such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving a dataset in an encoded format on a network communication interface; and means for transmitting a unicast transmission including a subset of the dataset on a direct communication interface to another UE when a non-unicast transmission is received indicating that the other UE failed to successfully receive the subset of the dataset.

In one configuration, the network communication interface includes a Uu interface or another interface for at least one of uplink or downlink communication with a base station, and the direct communication interface includes a PC5 interface or another interface for sidelink communication with the other UE.

In one configuration, the apparatus 1002, and in particular the cellular baseband processor 1004, may further include means for receiving the non-unicast transmission from the other UE, and the dataset is received in at least one of a broadcast transmission or a multicast transmission, and the non-unicast transmission includes at least one of another broadcast transmission or another multicast transmission.

In one configuration, the apparatus 1002, and in particular the cellular baseband processor 1004, may further include means for receiving, on the network communication interface, a configuration for communication of data on the direct communication interface to UEs that fail to successfully receive data on the network communication interface, and the subset of the dataset is transmitted based on the configuration.

In one configuration, the configuration indicates at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface.

In one configuration, the subset of the dataset is transmitted to the other UE in the encoded format.

In one configuration, the apparatus 1002, and in particular the cellular baseband processor 1004, may further include means for identifying the subset of the dataset in the encoded format based on the non-unicast transmission, and the non-unicast transmission includes information identifying the subset of the dataset in the encoded format.

In one configuration, the apparatus 1002, and in particular the cellular baseband processor 1004, may further include means for decoding the dataset in the encoded format to recover the dataset without the encoded format, and the dataset in the encoded format is encoded with a rateless code, and the dataset is decoded using a decoder configured for the rateless code.

In one other configuration, the apparatus 1002, and in particular the cellular baseband processor 1004, includes means for transmitting, on a direct communication interface, a non-unicast transmission indicating a failure to successfully receive a subset of a dataset on a network communication interface; and means for receiving a unicast transmission including the subset of the dataset on the direct communication interface.

In one other configuration, the network communication interface includes a Uu interface or another interface for at least one of uplink or downlink communication with a base station, and the direct communication interface includes a PC5 interface or another interface for sidelink communication with another UE.

In one other configuration, the apparatus 1002, and in particular the cellular baseband processor 1004, may further include means for receiving, on the network communication interface, a configuration for communication of data on the direct communication interface associated with failure to successfully receive data on the network communication interface, and the non-unicast transmission is transmitted based on the configuration.

In one other configuration, the configuration indicates at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface.

In one other configuration, the subset of the dataset is received in an encoded format from another UE.

In one other configuration, the non-unicast transmission identifies the subset of the dataset in the encoded format.

In one other configuration, the apparatus 1002, and in particular the cellular baseband processor 1004, may further include means for receiving another subset of the dataset in the encoded format on the network communication interface; and means for identifying the subset of the dataset in the encoded format that failed to be successfully received, and the non-unicast transmission indicating the failure to successfully receive the subset of the dataset is transmitted based on identifying the subset of the dataset that failed to be successfully received.

In one other configuration, the other subset of the dataset is received via at least one of a broadcast transmission or a multicast transmission, and the non-unicast transmission is transmitted via at least one of another broadcast transmission or another multicast transmission.

In one other configuration, the apparatus 1002, and in particular the cellular baseband processor 1004, may further include means for decoding the subset and the other subset of the dataset in the encoded format to recover the dataset without the encoded format, and each of the subset and the other subset of the dataset in the encoded format is encoded with a rateless code, and the dataset is recovered using a decoder configured for the rateless code.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
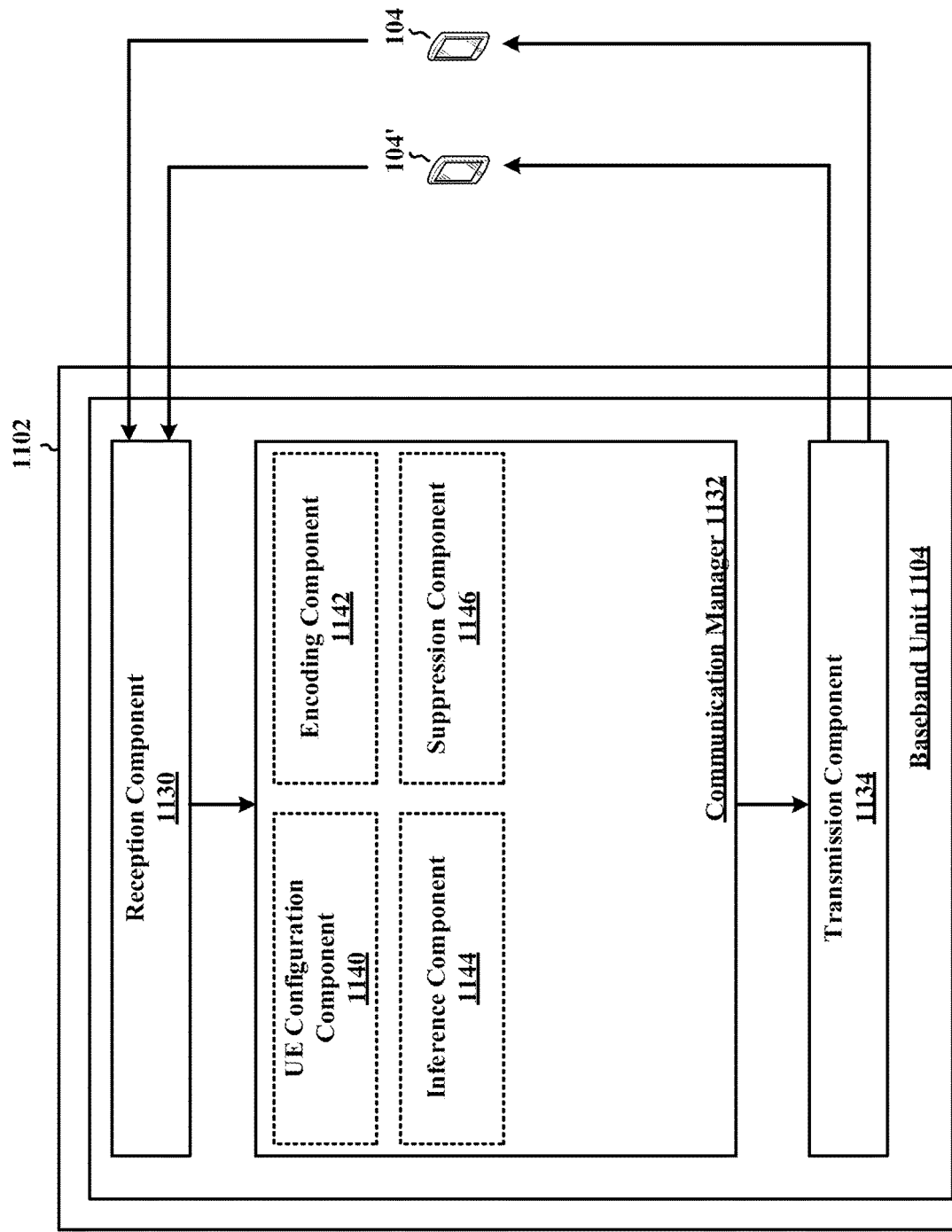
FIG. 11 is a diagram illustrating another example of a hardware implementation for at least one other example apparatus.

FIG. 11 is a diagram 1100 illustrating an example of a hardware implementation for an apparatus 1102. The apparatus 1102 is a base station and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 may include one or more components configured for various operations commensurate with UE-assisted NC communication. In some implementations, the communication manager 1132 includes one or more of a UE configuration component 1140, an encoding component 1142, and inference component 1144, and/or a suppression component 1146, as further described, infra.

The UE configuration component 1140 may configure a plurality of UEs 104, 104' to communicate data on a direct communication interface after receiving data on a network communication interface, e.g., as described in connection with 902 of FIG. 9. For example, the UE configuration component 1140 may configure the plurality of UEs 104, 104' for UE-assisted NC communication. The UE configuration component 1140 may allocate (or pre-allocate) at least one set of resources associated with UE-assisted NC communication, such as a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data transmitted on the network communication interface. The UE configuration component 1140 may transmit (e.g., through the transmission component 1134) configuration information on the network communication interface, which may indicate one or more of the preceding sets of resources.

The encoding component 1142 may be configured to encode an uncoded dataset into an encoded format using a rateless code for non-unicast transmission on the network communication interface, e.g., as described in connection with 904 of FIG. 9. For example, the base station may divide the uncoded dataset into k subpackets, and the base station may select a combination of subpackets for each transmission instance using an encoding function with a random or pseudorandom matrix. A rateless code may be any channel code without a fixed code rate used for encoding data to generate incremental redundancy codes.

The encoding component 1142 may be further configured to transmit (e.g., through the transmission component 1134) the non-unicast transmission including the dataset in an encoded format on the network communication interface, e.g., as described in connection with 906 of FIG. 9. For example, the dataset in the encoded format may include a set of encoded packets into which the dataset is encoded. The non-unicast transmission may be a broadcast or multicast transmission, for example, on a downlink channel.

The inference component 1144 may be configured to receive (e.g., through the reception component 1130) feedback indicating that at least one of the UEs 104, 104' successfully received the subset of the dataset on the network communication interface, e.g., as described in connection with 908 of FIG. 9. For example, the feedback may include at least one of a PDCP status report, an RLC status report, ARQ feedback indicating ACK or NACK, or HARQ feedback indicating ACK or NACK. In some aspects, the feedback may indicate the feedback is received from one UE 104' and the feedback indicates that another UE 104 failed to successfully receive the subset of the dataset on the direct communication interface and on the network communication interface.

The inference component 1144 may be further configured to infer that at least a subset of the dataset is successfully received on the direct communication interface, e.g., as described in connection with 910 of FIG. 9. The inference component 1144 may assume that the UEs 104, 104' will follow the configuration for UE-assisted NC communication, including responding to requests on the direct communication interface for missed packets. Therefore, if at least one UE has received an (encoded) packet, the inference component 1144 may infer that multiple UEs have received that (encoded) packet because that at least one UE will have transmitted the packet to the other UEs that did not receive the packet on the network communication interface. For each packet then, the inference component 1144 may detect whether at least one UE has received the packet (on the network interface), e.g., based on the received feedback The inference component 1144 may be further configured to determine whether the number of UEs failing to successfully receive the same subset of the dataset satisfies a threshold, e.g., as described in connection with 912 of FIG. 9. For example, for a given packet carrying a subset of the dataset, the inference component 1144 may determine if at least one UE has transmitted feedback acknowledging successful reception of the given packet. If the inference component 1144 finds at least one UE has acknowledged successfully receiving the given packet, the inference component 1144 may infer that some or all other UEs that failed to successfully receive the given packet on the network communication interface have successfully received the packet on the direct communication interface, either from the at least one UE that successfully received the given packet on the network communication interface or from another UE that successfully received the given packet on the direct communication interface. Thus, the inference component 1144 may assume that the threshold is not satisfied. In some aspects, the inference component 1144 may assume that every UE has received the given packet unless the inference component 1144 receives feedback from one UE indicating that another UE failed to acknowledge successfully receiving the given packet on the direct communication interface.

In some aspects, the threshold may be equal to all UEs that are intended recipients of a given packet. That is, the threshold may be satisfied when none of the UEs acknowledge successfully receiving a given packet. In some other aspects, the threshold may be equal to a percentage of all UEs that are intended recipients. For example, the threshold may be satisfied when seventy-five percent or ninety percent of the intended recipient UEs fail to successfully receive a given packet on the network communication interface.

If the inference component 1144 determines that the number of UEs failing to successfully receive a subset of the dataset does not satisfy a threshold, then the suppression component 1146 may be configured to suppress retransmission of the subset of the dataset on the network communication interface, e.g., as described in connection with 914 of FIG. 9. For example, the inference component 1144 may assume that another UE will supply any subsets of the dataset on a direct communication link, and so the base station may refrain from retransmitting subsets of the dataset on the network communication interface where one or more UEs has acknowledged successfully receiving the subsets.

If the inference component 1144 determines that the number of UEs failing to successfully receive a subset of the dataset satisfies a threshold, then the encoding component 1142 may be further configured to encode the subset of the dataset into a set of encoded packets for retransmission, e.g., as described in connection with 916 of FIG. 9. In some aspects, the encoding component 1142 may encode the subset of the dataset into the set of encoded packets for retransmission differently from another set of encoded packets into which the subset of the dataset is encoded for the non-unicast transmission. For example, the encoding component 1142 may combine a subpacket into which the dataset has be divided for retransmission with one or more other subpackets different from those with which the subpacket was combined for the earlier non-unicast transmission.

The inference component 1144 may be further configured to transmit (e.g., through the transmission component 1134) a retransmission of the subset of the dataset when the number of UEs failing to successfully receive the subset of the dataset fails to satisfy the threshold, e.g., as described in connection with 918 of FIG. 9.

The apparatus 1102 may include additional components that perform some or all of the blocks, operations, signaling, etc. of the algorithm(s) in the aforementioned call flow diagram 600 of FIG. 6 and/or flowchart 900 of FIG. 9. As such, some or all of the blocks, operations, signaling, etc. in the aforementioned call flow diagram 600 of FIG. 6 and/or flowchart 900 of FIG. 9 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for configuring a plurality of UEs to communicate data on a direct communication interface after receiving the data on a network communication interface; means for transmitting a non-unicast transmission including a dataset in an encoded format on the network communication interface; and means for suppressing retransmission of a subset of the dataset when a number of UEs failing to successfully receive the subset of the dataset fails to satisfy a threshold.

In one configuration, the apparatus 1102, and in particular the baseband unit 1104, may further include means for transmitting a retransmission of the subset of the dataset when the number of UEs satisfies the threshold.

In one configuration, the non-unicast transmission includes a set of encoded packets having the subset of the dataset in the encoded format, and the retransmission includes a retransmission of the set of encoded packets having the subset of the dataset in the encoded format.

In one configuration, the apparatus 1102, and in particular the baseband unit 1104, may further include means for encoding the subset of the dataset into a set of encoded packets for the retransmission, wherein the subset of the dataset is encoded into the set of encoded packets differently from another set of encoded packets into which the subset of the dataset is encoded for the non-unicast transmission.

In one configuration, the apparatus 1102, and in particular the baseband unit 1104, may further include means for receiving feedback indicating that at least one UE successfully received the subset of the dataset on the network communication interface, and the retransmission is suppressed based on the feedback.

In one configuration, the feedback includes at least one of a PDCP status report, a RLC status report, ARQ feedback indicating ACK or NACK, or HARQ feedback indicating ACK or NACK.

In one configuration, the feedback is received from one UE and the feedback indicates that another UE failed to successfully receive the subset of the dataset on the direct communication interface and on the network communication interface.

In one configuration, the apparatus 1102, and in particular the baseband unit 1104, may further include means for inferring that the subset of the dataset is successfully received on the direct communication interface by at least one other UE, the feedback does not indicate that the at least one other UE successfully received the subset of the dataset on the network communication interface, and the retransmission is suppressed based on the inferring.

In one configuration, the network communication interface includes a Uu interface or another interface for at least one of uplink or downlink communication, and the direct communication interface includes a PC5 interface or another interface for sidelink communication.

In one configuration, the apparatus 1102, and in particular the baseband unit 1104, may further include means for transmitting configuration information that indicates at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data transmitted on the network communication interface.

In one configuration, the apparatus 1102, and in particular the baseband unit 1104, may further include means for encoding the dataset into the encoded format using a rateless code for the non-unicast transmission on the network communication interface.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

According to some aspects of the present disclosure, an example 1 is a UE configured to receive a dataset in an encoded format on a network communication interface; and transmit a unicast transmission including a subset of the dataset on a direct communication interface to another UE when a non-unicast transmission is received indicating that the other UE failed to successfully receive the subset of the dataset.

Example 2 may be the UE of example 1, and the network communication interface includes a Uu interface or another interface for at least one of uplink or downlink communication with a base station, and the direct communication interface includes a PC5 interface or another interface for sidelink communication with the other UE.

Example 3 may be the UE of any of examples 1 or 2, and further configured to receive the non-unicast transmission from the other UE, and the dataset is received in at least one of a broadcast transmission or a multicast transmission, and the non-unicast transmission includes at least one of another broadcast transmission or another multi cast transmission.

Example 4 may be the UE of any of examples 1 through 3, and further configured to receive, on the network communication interface, a configuration for communication of data on the direct communication interface to UEs that fail to successfully receive data on the network communication interface, and the subset of the dataset is transmitted based on the configuration.

Example 5 may be the UE of example 4, and the configuration indicates at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface.

Example 6 may be the UE of any of examples 1 through 5, and the subset of the dataset is transmitted to the other UE in the encoded format.

Example 7 may be the UE of example 6, and further configured to identify the subset of the dataset in the encoded format based on the non-unicast transmission, and the non-unicast transmission includes information identifying the subset of the dataset in the encoded format.

Example 8 may be the UE of any of examples 1 through 7, and further configured to
decode the dataset in the encoded format to recover the dataset without the encoded format, and the dataset in the encoded format is encoded with a rateless code, and the dataset is decoded using a decoder configured for the rateless code.

According to some other aspects of the present disclosure, an example 9 is a UE configured to transmit, on a direct communication interface, a non-unicast transmission indicating a failure to successfully receive a subset of a dataset on a network communication interface; and receive a unicast transmission including the subset of the dataset on the direct communication interface.

Example 10 may be the UE of example 9, and the network communication interface includes a Uu interface or another interface for at least one of uplink or downlink communication with a base station, and the direct communication interface includes a PC5 interface or another interface for sidelink communication with another UE.

Example 11 may be the UE of any of examples 9 or 10, and further configured to receive, on the network communication interface, a configuration for communication of data on the direct communication interface associated with failure to successfully receive data on the network communication interface, and the non-unicast transmission is transmitted based on the configuration.

Example 12 may be the UE of example 11, and the configuration indicates at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface.

Example 13 may be the UE of any of examples 9 through 12, and the subset of the dataset is received in an encoded format from another UE.

Example 14 may be the UE of example 13, and the non-unicast transmission identifies the subset of the dataset in the encoded format.

Example 15 may be the UE of any of examples 13 or 14, and further configured to receive another subset of the dataset in the encoded format on the network communication interface; and identify the subset of the dataset in the encoded format that failed to be successfully received, and the non-unicast transmission indicating the failure to successfully receive the subset of the dataset is transmitted based on identifying the subset of the dataset that failed to be successfully received.

Example 16 may be the UE of example 15, and the other subset of the dataset is received via at least one of a broadcast transmission or a multicast transmission, and the non-unicast transmission is transmitted via at least one of another broadcast transmission or another multi cast transmission.

Example 17 may be the UE of example 15, and further configured to decode the subset and the other subset of the dataset in the encoded format to recover the dataset without the encoded format, and each of the subset and the other subset of the dataset in the encoded format is encoded with a rateless code, and the dataset is recovered using a decoder configured for the rateless code.

According to some other aspects of the present disclosure, an example 18 is a base station configured to configure a plurality of UEs to communicate data on a direct communication interface after receiving the data on a network communication interface; transmit a non-unicast transmission including a dataset in an encoded format on the network communication interface; and suppress retransmission of a subset of the dataset when a number of UEs failing to successfully receive the subset of the dataset fails to satisfy a threshold.

Example 19 is the base station of example 18, and further configured to transmit a retransmission of the subset of the dataset when the number of UEs satisfies the threshold.

Example 20 is the base station of example 19, and the non-unicast transmission includes a set of encoded packets having the subset of the dataset in the encoded format, and the retransmission includes a retransmission of the set of encoded packets having the subset of the dataset in the encoded format.

Example 21 is the base station of example 19, and further configured to encode the subset of the dataset into a set of encoded packets for the retransmission, and the subset of the dataset is encoded into the set of encoded packets differently from another set of encoded packets into which the subset of the dataset is encoded for the non-unicast transmission.

Example 22 is the base station of any of examples 19 through 21, and further configured to receive feedback indicating that at least one UE successfully received the subset of the dataset on the network communication interface, and the retransmission is suppressed based on the feedback.

Example 23 is the base station of example 22, and the feedback includes at least one of a PDCP status report, a RLC status report, ARQ feedback indicating ACK or NACK, or HARQ feedback indicating ACK or NACK.

Example 24 is the base station of any of examples 22 or 23, and the feedback is received from one UE and the feedback indicates that another UE failed to successfully receive the subset of the dataset on the direct communication interface and on the network communication interface.

Example 25 is the base station of any of examples 22 through 24, and further configured to infer that the subset of the dataset is successfully received on the direct communication interface by at least one other UE, and the feedback does not indicate that the at least one other UE successfully received the subset of the dataset on the network communication interface, and the retransmission is suppressed based on the inference.

Example 26 is the base station of any of examples 18 through 25, and the network communication interface includes a Uu interface or another interface for at least one of uplink or downlink communication, and the direct communication interface includes a PC5 interface or another interface for sidelink communication.

Example 27 is the base station of any of examples 18 through 26, and the configuring the plurality of UEs includes transmit configuration information that indicates at least one of a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data transmitted on the network communication interface.

Example 28 is the base station of any of examples 18 through 27, and further configured to encode the dataset into the encoded format using a rateless code for the non-unicast transmission on the network communication interface.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving, from a base station via a network communication interface, a configuration for communication of data on a direct communication interface to UEs that fail to successfully receive data on the network communication interface, wherein the configuration indicates a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface;
    receiving, from the base station via the network communication interface, a dataset including a plurality of packets in an encoded format, the encoded format being based on a randomly or pseudorandomly generated encoding matrix including rows corresponding to different packet combinations;
    receiving, from another UE, a non-unicast transmission indicating that the other UE failed to successfully receive a subset of the dataset, wherein the non-unicast transmission includes at least one of a packet identifier (ID), a sequence ID, or a hostname or host ID identifying the subset of the dataset in the encoded format; and
    transmitting, to the other UE via a direct communication interface, a unicast transmission including the subset of the dataset after receiving the non-unicast transmission based on the configuration.

2. The method of claim 1, wherein the network communication interface comprises a Uu interface or another interface for at least one of uplink or downlink communication with the base station, and the direct communication interface comprises a PC5 interface or another interface for sidelink communication with the other UE.

3. The method of claim 1, wherein
    the dataset is received in at least one of a broadcast transmission or a multicast transmission, and the non-unicast transmission comprises at least one of another broadcast transmission or another multicast transmission.

4. The method of claim 1, wherein the subset of the dataset is transmitted to the other UE in the encoded format.

5. The method of claim 4, further comprising:
identifying the subset of the dataset in the encoded format based on the non-unicast transmission.

6. The method of claim 1, further comprising:
decoding the dataset in the encoded format to recover the dataset, wherein
the dataset in the encoded format is encoded with a rateless code, and the dataset is decoded using a decoder configured for the rateless code.

7. A method of wireless communication at a user equipment (UE), comprising:
receiving, on a network communication interface, a configuration for communication of data on a direct communication interface associated with failure to successfully receive data on the network communication interface, wherein the configuration indicates a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface;
transmitting, via the direct communication interface, a non-unicast transmission indicating a failure to successfully receive a subset of a dataset including a plurality of packets via a network communication interface based on the configuration, wherein the non-unicast transmission includes at least one of a packet identifier (ID), a sequence ID, or a hostname or host ID identifying the subset of the dataset in an encoded format, the encoded format being based on a randomly or pseudorandomly generated encoding matrix including rows corresponding to different packet combinations; and
receiving, from another UE via the direct communication interface, a unicast transmission including the subset of the dataset.

8. The method of claim 7, wherein the network communication interface comprises a Uu interface or another interface for at least one of uplink or downlink communication with a base station, and the direct communication interface comprises a PC5 interface or another interface for sidelink communication with the other UE.

9. The method of claim 7, wherein the subset of the dataset is received in the encoded format.

10. The method of claim 9, wherein the non-unicast transmission identifies the subset of the dataset in the encoded format.

11. The method of claim 9, further comprising:
receiving another subset of the dataset in the encoded format on the network communication interface; and
identifying the subset of the dataset in the encoded format that failed to be successfully received, wherein
the non-unicast transmission indicating the failure to successfully receive the subset of the dataset is transmitted based on identifying the subset of the dataset that failed to be successfully received.

12. The method of claim 11, wherein the other subset of the dataset is received via at least one of a broadcast transmission or a multicast transmission, and the non-unicast transmission is transmitted via at least one of another broadcast transmission or another multicast transmission.

13. The method of claim 11, further comprising:
decoding the subset and the other subset of the dataset in the encoded format to recover the dataset without the encoded format, wherein each of the subset and the other subset of the dataset in the encoded format is encoded with a rateless code, and the dataset is recovered using a decoder configured for the rateless code.

14. An apparatus for wireless communication at a user equipment (UE), comprising:
a memory; and
at least one processor coupled to the memory and configured to:
receive, from a base station via a network communication interface, a configuration for communication of data on a direct communication interface to UEs that fail to successfully receive data on the network communication interface, wherein the configuration indicates a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface;
receive, from the base station via the network communication interface, a dataset including a plurality of packets in an encoded format, the encoded format being based on a randomly or pseudorandomly generated encoding matrix including rows corresponding to different packet combinations;
receive, from another UE, a non-unicast transmission indicating that the other UE failed to successfully receive a subset of the dataset, wherein the non-unicast transmission includes at least one of a packet identifier (ID), a sequence ID, or a hostname or host ID identifying the subset of the dataset in the encoded format; and
transmit, to the other UE via a direct communication interface, a unicast transmission including the subset of the dataset after the non-unicast transmission is received based on the configuration.

15. The apparatus of claim 14, wherein the network communication interface comprises a Uu interface or another interface for at least one of uplink or downlink communication with the base station, and the direct communication interface comprises a PC5 interface or another interface for sidelink communication with the other UE.

16. The apparatus of claim 14, wherein
the dataset is received in at least one of a broadcast transmission or a multicast transmission, and
the non-unicast transmission comprises at least one of another broadcast transmission or another multicast transmission.

17. The apparatus of claim 14, wherein the subset of the dataset is transmitted to the other UE in the encoded format.

18. An apparatus for wireless communication at a user equipment (UE), comprising:
a memory; and
at least one processor coupled to the memory and configured to:

receive, on a network communication interface, a configuration for communication of data on a direct communication interface associated with failure to successfully receive data on the network communication interface, wherein the configuration indicates a first set of resources allocated for non-unicast transmissions indicating data that is unsuccessfully received on the network communication interface, a second set of resources on the direct communication interface allocated for unicast transmissions of data received on the network communication interface, and a third set of resources on the network communication interface allocated for uplink feedback reporting for data received on the network communication interface;

transmit, via a direct communication interface, a non-unicast transmission indicating a failure to successfully receive a subset of a dataset including a plurality of packets via a network communication interface based on the configuration, wherein the non-unicast transmission includes at least one of a packet identifier (ID), a sequence ID, or a hostname or host ID identifying the subset of the dataset in an encoded format, the encoded format being based on a randomly or pseudorandomly generated encoding matrix including rows corresponding to different packet combinations; and receive, from another UE via the direct communication interface, a unicast transmission including the subset of the dataset.

19. The apparatus of claim 18, wherein the network communication interface comprises a Uu interface or another interface for at least one of uplink or downlink communication with a base station, and the direct communication interface comprises a PC5 interface or another interface for sidelink communication with the other UE.

20. The apparatus of claim 18, wherein the subset of the dataset is received in the encoded format.

21. The apparatus of claim 20, wherein the non-unicast transmission identifies the subset of the dataset in the encoded format.

* * * * *